(12) United States Patent
Chandran et al.

(10) Patent No.: US 12,346,830 B2
(45) Date of Patent: Jul. 1, 2025

(54) PRIVATE INFERENCE IN DEEP NEURAL NETWORK

(71) Applicant: Microsoft Technology Licensing, LLC, Redmond, WA (US)

(72) Inventors: Nishanth Chandran, Bangalore (IN); Divya Gupta, Bangalore (IN); Aseem Rastogi, Bangalore (IN); Rahul Sharma, Bangalore (IN); Nishant Kumar, Ranchi (IN); Mayank Rathee, Panchkula (IN); Deevashwer Rathee, Panchkula (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1129 days.

(21) Appl. No.: 17/085,986

(22) Filed: Oct. 30, 2020

(65) Prior Publication Data

US 2023/0032519 A1 Feb. 2, 2023

Related U.S. Application Data

(60) Provisional application No. 63/051,754, filed on Jul. 14, 2020.

(51) Int. Cl.
*G06N 5/04* (2023.01)
*G06N 3/08* (2023.01)
*H04L 9/34* (2006.01)

(52) U.S. Cl.
CPC ............ *G06N 5/04* (2013.01); *G06N 3/08* (2013.01); *H04L 9/34* (2013.01); *H04L 2209/46* (2013.01); *H04L 2209/50* (2013.01)

(58) Field of Classification Search
None
See application file for complete search history.

(56) References Cited

U.S. PATENT DOCUMENTS 11,507,883 B2* 11/2022 Gomez ............... G06F 21/602
2019/0228299 A1* 7/2019 Chandran ............. G06N 3/04
(Continued)

FOREIGN PATENT DOCUMENTS

CN 110537191 A 12/2019

OTHER PUBLICATIONS

Mohassel, et al., "ABY3: A Mixed Protocol Framework for Machine Learning", in Proceedings of ACM SIGSAC Conference on Computer and Communications Security, Oct. 15, 2018, pp. 35-52.
(Continued)

*Primary Examiner* — Haimei Jiang
(74) *Attorney, Agent, or Firm* — Workman Nydegger

(57) ABSTRACT

A secure inference over Deep Neural Networks (DNNs) using secure two-party computation to perform privacy-preserving machine learning. The secure inference uses a particular type of comparison that can be used as a building block for various layers in the DNN including, for example, ReLU activations and divisions. The comparison securely computes a Boolean share of a bit representing whether input value x is less than input value y, where x is held by a user of the DNN, and where y is held by a provider of the DNN. Each party computing system parses their input into leaf strings of multiple bits. This is much more efficient than if the leaf strings were individual bits. Accordingly, the secure inference described herein is more readily adapted for using in complex DNNs.

20 Claims, 4 Drawing Sheets

(56) References Cited

U.S. PATENT DOCUMENTS

2021/0209247 A1* 7/2021 Mohassel ............ A63B 21/023
2022/0092216 A1* 3/2022 Mohassel ............ G06N 3/084

OTHER PUBLICATIONS

Mohassel, et al., "SecureML: A System for Scalable Privacy-Preserving Machine Learning", in Proceedings of IEEE Symposium on Security and Privacy, May 22, 2017, pp. 19-38.
Nagel, et al., "Data-Free Quantization Through Weight Equalization and Bias Correction", in Proceedings of IEEE International Conference on Computer Vision, 2019, pp. 1325-1334.
Pattuk, et al., "CheapSMC: A Framework to Minimize Secure Multiparty Computation Cost in the Cloud", in Proceedings of IFIP Annual Conference on Data and Applications Security and Privacy, Jul. 18, 2016, 9 Pages.
Rabin, Michael O., "How to Exchange Secrets With Oblivious Transfer", Retrieved From: https://www.iacr.org/museum/rabin-obt/obtrans-eprint187.pdf, May 20, 1981, 26 Pages.
Riazi, et al., "Chameleon: A Hybrid Secure Computation Framework for Machine Learning Applications", in Proceedings of Asia Conference on Computer & Communications Security, Jun. 4, 2018, pp. 707-721.
Riazi, et al., "XONN: XNOR-based Oblivious Deep Neural Network Inference", in Proceedings of 28th USENIX Security Symposium, 2019, 18 Pages.
Rouhani, et al., "Deepsecure: Scalable Provably-Secure Deep Learning", in Proceedings of the 55th Annual Design Automation Conference, Jun. 24, 2018, 13 Pages.
Shamir, Adi, "How to Share a Secret", in Journal of Communications of the ACM, vol. 22, Issue 11, Nov. 1979, pp. 612-613.
Smart, et al., "Fully Homomorphic SIMD Operations", in Cryptology ePrint Archive: Report 2011/133, 2011, 19 Pages.
Wagh, et al., "SecureNN: 3-Party Secure Computation for Neural Network Training", in Proceedings on Privacy Enhancing Technologies, Jul. 1, 2019, pp. 26-49.
Yao, Andrew Chi-Chih., "How to Generate and Exchange Secrets (Extended Abstract)", in Proceedings of 27th Annual Symposium on Foundations of Computer Science, Oct. 27, 1986, pp. 162-167.
Zheng, et al., "Helen: Maliciously Secure Coopetitive Learning for Linear Models", in Proceedings of IEEE Symposium on Security and Privacy, May 19, 2019, pp. 724-738.
Zhu, et al., "Using Microsoft AI to Build a Lung-Disease Prediction Model Using Chest X-Ray Images", Retrieved From: https://docs.microsoft.com/en-gb/archive/blogs/machinelearning/using-microsoft-ai-to-build-a-lung-disease-prediction-model-using-chest-x-ray-images, Jul. 3, 2018, 13 Pages.
"International Search Report and Written Opinion Issued in PCT Application No. PCT/US2021/032131", Mailed Date: Sep. 9, 2021, 12 Pages.
Riazi, et al., "Deep Learning on Private Data", in Proceedings of IEEE Security & Privacy, vol. 17, Issue 6, Nov. 2019, pp. 54-63.
Office Action Received for European Application No. 21733251.9, mailed on Feb. 13, 2024, 7 pages.
Wang, et al.,"EMP-toolkit: Efficient MultiParty computation toolkit", Retrieved from: https://github.com/emp-toolkit, 2016, 3 Pages.
Laine, et al., "Microsoft SEAL", Retrieved from: https://github.com/Microsoft/SEAL, 2019, 22 Pages.
Abadi, et al., "TensorFlow: Large-Scale Machine Learning on Heterogeneous Distributed Systems", in Repository of of arXiv preprint arXiv:1603.04467, Mar. 14, 2016, 19 Pages.
Agrawal, et al., "Quotient: Two-Party Secure Neural Network Training and Prediction", in Proceedings of the ACM SIGSAC Conference on Computer and Communications Security, Nov. 11, 2019, pp. 1231-1247.
Asharov, et al., "More Efficient Oblivious Transfer and Extensions for Faster Secure Computation", in Proceedings of the ACM SIGSAC Conference on Computer & Communications Security, Nov. 4, 2013, pp. 535-547.
Ball, et al., "Garbled Neural Networks are Practical", Retrieved From: https://eprint.iacr.org/2019/338.pdf, Jun. 24, 2019, 29 Pages.
Beaver, Donald, "Efficient Multiparty Protocols Using Circuit Randomization", in Proceedings of Annual International Cryptology Conference, Aug. 11, 1991, pp. 420-432.
Beaver, Donald, "Correlated Pseudorandomness and the Complexity of Private Computations", in Proceedings of the Twenty-Eighth Annual ACM Symposium on the Theory of Computing, May 22, 1996, pp. 479-488.
Bellare, et al., "Efficient Garbling from a Fixed-Key Blockcipher", in Proceedings of the IEEE Symposium on Security and Privacy, May 19, 2013, 34 Pages.
Bellare, et al., "Random Oracles are Practical: A Paradigm for Designing Efficient Protocols.", in Proceedings of the 1st ACM Conference on Computer and Communications Security, Nov. 3, 1993, pp. 62-73.
Blakley, G. R., "Safeguarding cryptographic keys", in Proceedings of International Workshop on Managing Requirements Knowledge, Jun. 4, 1979, pp. 313-317.
Boemer, et al., "nGraph-HE: A Graph Compiler for Deep Learning on Homomorphically Encrypted Data", in Proceedings of the 16th ACM International Conference on Computing Frontiers, Apr. 30, 2019, pp. 3-15.
Boemer, et al., "nGraph-HE2: A High-Throughput Framework for Neural Network Inference on Encrypted Data", in Proceedings of the 7th ACM Workshop on Encrypted Computing & Applied Homomorphic Cryptography, Nov. 11, 2019, pp. 45-56.
Bost, et al., "Machine Learning Classification over Encrypted Data", in Proceedings of 22nd Annual Network and Distributed System Security Symposium, Feb. 8, 2015, 14 Pages.
Brakerski, et al., "Fully Homomorphic Encryption without Modulus Switching from Classical GapSVP", in Proceedings of 32nd Annual Cryptology Conference on Advances in Cryptology—Crypto 2012, Aug. 19, 2012, pp. 868-886.
Brassard, et al., "All-or-Nothing Disclosure of Secrets", in Proceedings of Conference on the Theory and Application of Cryptographic Techniques, Aug. 11, 1986, pp. 234-238.
Büscher, et al., "HyCC: Compilation of Hybrid Protocols for Practical Secure Computation", in Proceedings of the ACM SIGSAC Conference on Computer and Communications Security, Oct. 15, 2018, pp. 847-861.
Canetti, Ran, "Security and Composition of Multiparty Cryptographic Protocols", in Journal of Cryptology, vol. 13, Issue 1, Jan. 1, 2000, pp. 143-202.
Chandran, et al., "EzPC: Programmable and Efficient Secure Two-Party Computation for Machine Learning", in Proceedings of IEEE European Symposium on Security and Privacy, Jun. 17, 2019, pp. 496-511.
Chen, et al., "Secure Computation for Machine Learning With SPDZ", in repository of https://arxiv.org/pdf/1901.00329.pdf, Jan. 2, 2019, 7 Pages.
Couteau, Geoffroy, "New Protocols for Secure Equality Test and Comparison", in Proceedings of International Conference on Applied Cryptography and Network Security, Jul. 2, 2018, 34 Pages.
Dalskov, et al., "Secure Evaluation of Quantized Neural Networks", Retrieved From: https://eprint.iacr.org/2019/131.pdf, 2019, 22 Pages.
Dathathri, et al., "CHET: An Optimizing Compiler for Fully-Homomorphic Neural-Network Inferencing", in Proceedings of the 40th ACM SIGPLAN Conference on Programming Language Design and Implementation, Jun. 22, 2019, pp. 142-156.
Demmler, et al., "ABY—A Framework for Efficient Mixed-Protocol Secure Two-Party Computation", in Proceedings of 22nd Annual Network and Distributed System Security Symposium, Feb. 8, 2015, 15 Pages.
Deng, et al., "Imagenet: A large-scale hierarchical image database", in Proceedings of IEEE Conference on Computer Vision and Pattern Recognition, Jun. 20, 2009, 8 Pages.
Dowlin, et al., "Cryptonets: Applying Neural Networks to Encrypted Data with High Throughput and Accuracy", in Proceedings of the 33rd International Conference on Machine Learning, Jun. 11, 2016, 10 Pages.

(56) References Cited

OTHER PUBLICATIONS

Even, et al., "A Randomized Protocol for Signing Contracts", in Journal of Communications of ACM, vol. 28, Issue 6, Jun. 1, 1985, pp. 637-647.

Fan, et al., "Somewhat Practical Fully Homomorphic Encryption", Retrieved From: http://citeseerx.ist.psu.edu/viewdoc/download?doi=10.1.1.400.6346&rep=rep1&type=pdf, Jan. 2012, 19 Pages.

Garay, et al., "Practical and Secure Solutions for Integer Comparison", in Proceedings of International Workshop on Public Key Cryptography, Apr. 16, 2007, pp. 330-342.

Gentry, Craig, "Fully Homomorphic Encryption Using Ideal Lattices", in Proceedings of Forty-First Annual ACM Symposium on theory of Computing, May 31, 2009, pp. 169-178.

Goldreich, et al., "How to Play any Mental Game or a Completeness Theorem for Protocols with Honest Majority", in Proceedings of the Nineteenth Annual ACM Symposium on Theory of Computing, vol. 87, Jan. 1987, pp. 218-229.

Gueron, et al., "AES-GCM-SIV implementations (128 and 256 bit)", Retrieved From: https://github.com/Shay-Gueron/AES-GCM-SIV, 2016, 3 Pages.

Gueron, "Fast Garbling of Circuits Under Standard Assumptions", in Journal of Cryptology, vol. 31, Issue 3, Jul. 1, 2018, pp. 798-844.

Guo, et al., "Efficient and Secure Multiparty Computation from Fixed-Key Block Ciphers", in Proceedings of IEEE Symposium on Security and Privacy, May 18, 2020, 30 Pages.

Hazay, et al., "LevioSA: Lightweight Secure Arithmetic Computation", in Proceedings of the ACM Conference on Computer and Communications Security, Nov. 11, 2019, pp. 327-344.

He, et al., "Deep Residual Learning for Image Recognition", in Proceedings of the IEEE Conference on Computer Vision and Pattern Recognition, Jun. 27, 2016, pp. 770-778.

Huang, et al., "Densely Connected Convolutional Networks", in Proceedings of the IEEE Conference on Computer Vision and Pattern Recognition, Jul. 21, 2017, pp. 4700-4708.

Hubara, et al., "Binarized Neural Networks", in Proceedings of Advances in Neural Information Processing Systems, 2016, 9 Pages.

Iandola, et al., "SqueezeNet: AlexNet-level Accuracy with 50x Fewer Parameters and <1MB Model Size", in Repository of arXiv:1602.07360v4, Nov. 4, 2016, 13 Pages.

Ishai, et al., "Extending Oblivious Transfers Efficiently", in Proceedings of Annual International Cryptology Conference, Aug. 17, 2003, pp. 145-161.

Jacob, et al., "Quantization and Training of Neural Networks for Efficient Integer-Arithmetic-Only Inference", in Proceedings of IEEE Conference on Computer Vision and Pattern Recognition, Jun. 18, 2018, pp. 2704-2713.

Juvekar, et al., "Gazelle: A Low Latency Framework for Secure Neural Network Inference", in Proceedings of the 27th USENIX Conference on Security Symposium, Aug. 15, 2018, pp. 1651-1668.

Kolesnikov, et al., "Improved OT Extension for Transferring Short Secrets", in Proceedings of Annual Cryptology Conference, Aug. 18, 2013, pp. 54-70.

Kumar, et al., "CrypTFlow: An End-to-end System for Secure TensorFlow Inference", Retrieved From: https://github.com/mpc-msri/EzPC, Retrieved Date: May 1, 2020, 4 Pages.

Kumar, et al., "Cryptflow: Secure tensorflow inference", in Proceedings of IEEE Symposium on Security and Privacy, May 18, 2020, 18 Pages.

Laine, Kim, "Simple Encrypted Arithmetic Library 2.3.1", Retrieved From: https://www.microsoft.com/en-us/research/uploads/prod/2017/11/sealmanual-2-3-1.pdf, 2017, 34 Pages.

Lehmkuhl, et al., "Delphi: A Cryptographic Inference Service for Neural Networks", Retrieved From: https://github.com/mc2-project/delphi, Retrieved Date: May 1, 2020, 7 Pages.

Lindell, Yehuda, "How to Simulate It—A Tutorial on the Simulation Proof Technique", in Cryptology ePrint Archive, Report 2016/046, 2016, 65 Pages.

Liu, et al., "Oblivious Neural Network Predictions via MiniONN Transformations", in Proceedings of ACM SIGSAC Conference on Computer and Communications Security, Oct. 30, 2017, pp. 619-631.

Mishra, et al., "Delphi: A Cryptographic Inference Service for Neural Networks", in Proceedings of 29th USENIX Security Symposium, 2020, 18 Pages.

U.S. Appl. No. 63/051,754, filed Jul. 14, 2020.

Decision to grant a European patent pursuant to Article 97(1) Received in European Patent Application No. 21733251.9, mailed on May 31, 2024, 02 pages.

\* cited by examiner

Figure 1: The left y-axis shows $\left(\frac{GC\ Time}{Our\ Time}\right)$. The right y-axis shows the total number of ReLU layers corresponding to each layer size in our benchmark set. The legend entries denote the input domain and the network setting.

PRIVATE INFERENCE IN DEEP NEURAL NETWORK

CROSS-REFERENCE TO RELATED APPLICATION

This application claims the benefit of U.S. Provisional Application No. 63/051,754 filed Jul. 14, 2020, which is hereby incorporated herein by reference in its entirety.

BACKGROUND

Machine learning is often performed by training a deep neural network (DNN) on data (called "training data"). Training the neural network involves changing the weights w of the DNN until the DNN gives accurate inference. For example, a DNN could be trained on medical images in order to predict the presence or absence of certain diseases, alerting a doctor for further evaluation. Later, the trained DNN can be used to actually formulate a prediction on new data (called herein "evaluation data") not used during training.

Whether training the DNN or evaluation using the DNN, it is often important to preserve privacy. Recently, there have been many works that have made advances towards realizing secure inference [4, 6, 14, 18, 20, 23, 30, 42, 47, 48, 50, 54, 56]. In the nomenclature used within this application, when numbers are included within square brackets, this application is referencing correspondingly numbered documents in the bibliography included in the provisional application that has been incorporated herein, and reproduced further below in Section 11. Emerging applications for secure inference are in healthcare where prior work [4, 44, 54] has explored secure inference services for privacy preserving medical diagnosis of chest diseases, diabetic retinopathy, malaria, and so on.

Consider a server that holds the weights w of a publicly known deep neural network (DNN), F, that has been trained on private data (e.g., actual medical images of patients). A client holds a private input x (a new patient's medical image); in a standard machine learning (ML) inference task, the goal is for the client to learn the prediction F (x,w) (e.g., a possible diagnosis) of the server's model on the input x. In secure inference, the inference is performed with the guarantee that the server learns nothing about x and the client learns nothing about the server's model w beyond what can be deduced from F (x,w) and x.

One work that considered the secure computation of machine learning inference algorithms was that of [15] who considered algorithms such as Naïve Bayes and decision trees. SecureML [50] considered secure neural network inference and training. Apart from the works mentioned earlier, other works in this area include works that considered malicious adversaries [21, 35, 63] (for simpler ML models like linear models, regression, and polynomials) as well as specialized DNNs with 1 or 2 bit weights [4, 54, 56].

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

Embodiments disclosed herein relate to secure inference over Deep Neural Networks (DNNs) using secure two-party computation to perform privacy-preserving machine learning. This privacy means that the provider of the deep neural network does not learn anything about inputs to the deep neural network, and the provider of inputs to the deep neural network does not learn anything about weights of the deep neural network beyond that which can be inferred from the output of the deep neural network and the inputs to the deep neural network.

The secure inference uses a particular type of comparison that can be used as a building block for various layers in the DNN including, for example, ReLU activations and divisions. The comparison securely computes a Boolean share of a bit representing whether input value x is less than input value y, where x is held by a user of the DNN, and where y is held by a provider of the DNN.

A computing system of one party to the comparison parses x into q leaf strings $x_{q-1} \ldots x_0$, where each of the q leaf strings is more than one bit, and where x is equal to the concatenation $x_{q-1} \| \ldots \| x_0$. Meanwhile the computing system of the second party parses y into q leaf strings $y_{q-1} \ldots y_0$, where each of the q leaf strings is more than one bit, and where x is equal to the concatenation $y_{q-1} \| \ldots \| y_0$. Note that each leaf string constitutes multiple bits. This is much more efficient than if the leaf strings were individual bits. Accordingly, the secure inference described herein is more readily adapted for using in complex DNNs.

Each party computing system then computes shares of inequality $1\{x_n < y_n\}$ for each of at least some n from q−1 down to 1, where y is equal to the concatenation $y_{q-1} \| \ldots \| y_0$, by in each case using oblivious transfer. In addition, the systems computes their respective shares of equality $1\{x_n = y_n\}$ for each of at least some n from q−1 down to 1 also in each case by using oblivious transfer. The systems recursively calculates their respective shares of inequality of internal nodes according to the following equation: $1\{x_C < y_C\} = 1\{x_B < y_B\} \oplus (1\{x_B = y_B\} \wedge 1\{x_A < y_A\}$ (where $x_C = x_B \| x_A$, and $y_C = y_B \| y_A$), and their respective shares of equality of internal nodes until their respective Boolean share of $1\{x < y\}$ is determined.

This comparison can be performed at many layers in the DNN to thereby traverse the garbled binary circuit that represents the DNN. Furthermore, each party computing system has access to only their respective share of the information at each internal node in the garbled circuit. Accordingly, the computing systems mutually perform the DNN layers in a manner that their respective data input into the process (e.g., the training data or the evaluation data for the first party computing system, and the weights for the second party computing system) are kept from being disclosed to the opposite party. Thus, privacy is preserved.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

1. Introduction

Figure 1:
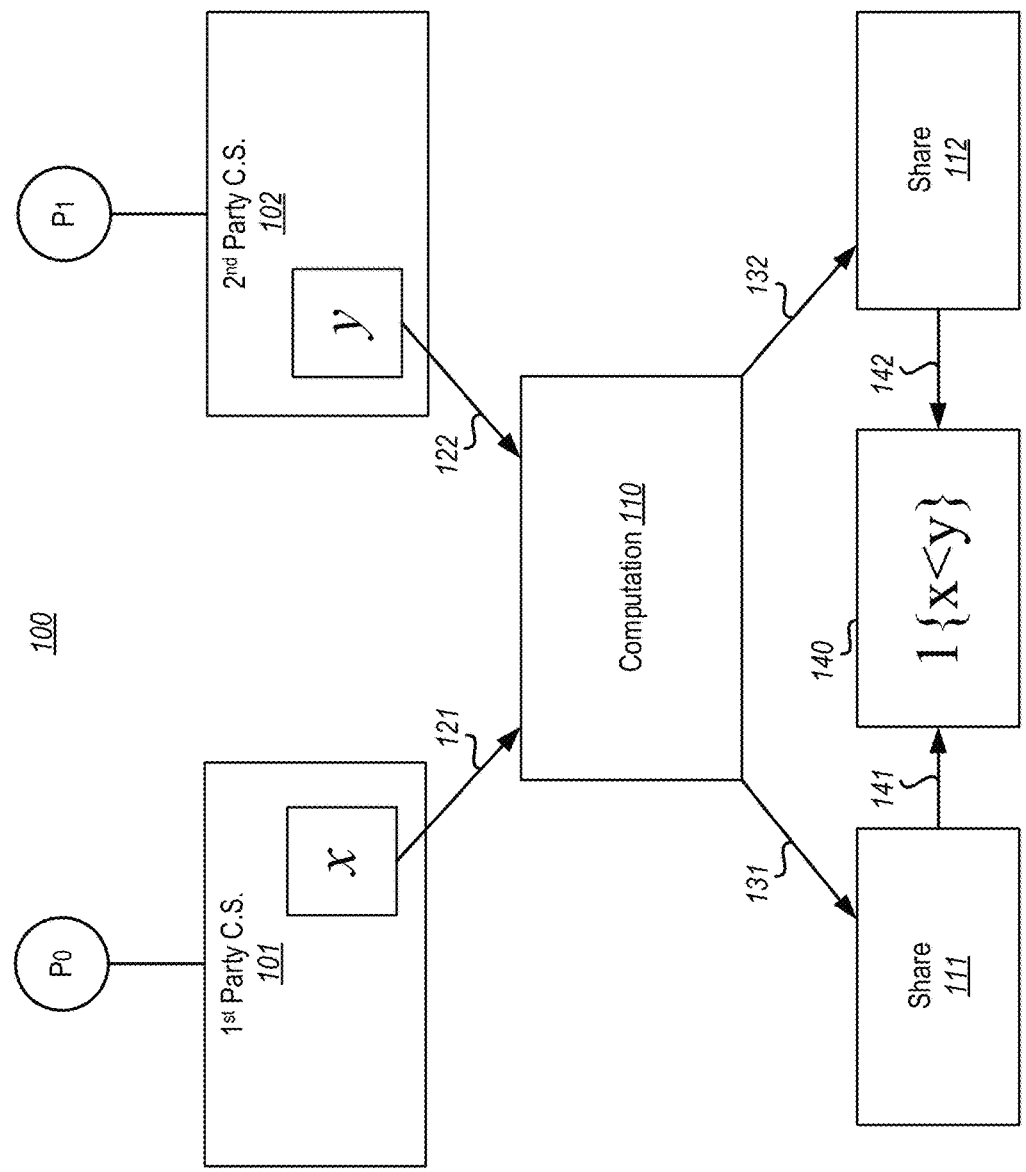
FIG. 1 illustrates an environment in which the principles described herein in which a first party computing system and a second party computing system perform secure two-party computation over a Deep Neural Network (DNN)

Embodiments disclosed herein relate to secure inference over Deep Neural Networks (DNNs) using secure two-party computation to perform privacy-preserving machine learning. This privacy means that the provider of the deep neural network does not learn anything about inputs to the deep neural network, and the provider of inputs to the deep neural network does not learn anything about weights of the deep neural network beyond that which can be inferred from the output of the deep neural network and the inputs to the deep neural network.

The secure inference uses a particular type of comparison that can be used as a building block for various layers in the DNN including, for example, ReLU activations and divisions. The comparison securely computes a Boolean share of a bit representing whether input value x is less than input value y, where x is held by a user of the DNN, and where y is held by a provider of the DNN.

A computing system of one party to the comparison parses x into q leaf strings $x_{q-1} \ldots x_0$, where each of the q leaf strings is more than one bit, and where x is equal to the concatenation $x_{q-1} \| \ldots \| x_0$. Meanwhile the computing system of the second party parses y into q leaf strings $y_{q-1} \ldots y_0$, where each of the q leaf strings is more than one bit, and where x is equal to the concatenation $y_{q-1} \| \ldots \| y_0$. Note that each leaf string constitutes multiple bits. This is much more efficient than if the leaf strings were individual bits. Accordingly, the secure inference described herein is more readily adapted for using in complex DNNs.

Each party computing system then computes shares of inequality $1\{x_n < y_n\}$ for each of at least some n from q−1 down to 1, where y is equal to the concatenation $y_{q-1} \| \ldots \| y_0$, by in each case using oblivious transfer. In addition, the systems computes their respective shares of equality $1\{x_n = y_n\}$ for each of at least some n from q−1 down to 1 also in each case by using oblivious transfer. The systems recursively calculates their respective shares of inequality of internal nodes according to the following equation: $1\{x_C < y_C\} = 1\{x_B < y_B\} \oplus (1\{x_B = y_B\} \wedge 1\{x_A < y_A\}$ (where $x_C = x_B \| x_A$, and $y_C = y_B \| y_A$), and their respective shares of equality of internal nodes until their respective Boolean share of $1\{x < y\}$ is determined.

This comparison can be performed at many layers in the DNN to thereby traverse the garbled binary circuit that represents the DNN. Furthermore, each party computing system has access to only their respective share of the information at each internal node in the garbled circuit. Accordingly, the computing systems mutually perform the DNN layers in a manner that their respective data input into the process (e.g., the training data or the evaluation data for the first party computing system, and the weights for the second party computing system) are kept from being disclosed to the opposite party. Thus, privacy is preserved.

A solution for secure inference such as the one described herein that scales to practical machine learning (ML) tasks would open a plethora of applications based on MLaaS (ML as a Service). Users can obtain value from ML services without worrying about the loss of their private data, while model owners can effectively offer their services with no fear of breaches of client data (they never observe private client data in the clear).

Secure inference is an instance of secure 2-party computation (2PC) and cryptographically secure general protocols for 2PC have been known for decades [31, 62]. However, secure inference for practical ML tasks, e.g., ImageNet scale prediction [25], is challenging for two reasons: a) realistic DNNs use ReLU activations (ReLU(x) is defined as max(x, 0)) that are expensive to compute securely; and b) preserving inference accuracy requires a faithful implementation of secure fixed-point arithmetic. Conventional implementations [6, 30, 42, 47, 48, 50] of ReLUs can include replacing the activation with approximations that are more tractable for 2PC [23, 30, 48], which his approach results in significant accuracy losses that can degrade user experience. The only approaches known to the inventors to evaluate ReLUs efficiently require sacrificing security by making the untenable assumption that a non-colluding third party takes part in the protocol [7, 44, 49, 55, 60] or by leaking activations [13]. Moreover, some prior works [44, 48-50, 60] even sacrifice correctness of their fixed point implementations and the result of their secure execution can sometimes diverge from the expected result, i.e. cleartext execution, in random and unpredictable ways. Thus, correct and efficient 2PC protocols for secure inference over realistic DNNs remain elusive.

1.1 Our Contribution

In this work, we address the above two challenges and build new semi-honest secure 2-party cryptographic protocols for secure computation of DNN inference. Our new efficient protocols enable the first secure implementations of ImageNet scale inference that complete in under a minute! We make three main contributions:

First, we give a new comparison protocol that enables us to securely and efficiently evaluate the non-linear layers of DNNs such as ReLU, Maxpool and Argmax.

Second, we provide new protocols for division. Together with new theorems that we prove on fixed-point arithmetic overshares, we show how to evaluate linear layers, such as convolutions, average pool and fully connected layers, faithfully.

Finally, by providing protocols that can work on a variety of input domains, we build a system PIE that supports two different types of secure inference protocols where linear layers can be evaluated using either homomorphic encryption ($PIE_{HE}$) or through oblivious transfer ($PIE_{OT}$).

We now provide more details of our main contributions.

New millionaires' protocol. Our first main technical contribution is a novel protocol for the well-known millionaires' problem [62], where parties $P_0$ and $P_1$ hold $\ell$-bit integers x and y, respectively, and want to securely compute x<y (or, secret shares of x<y). The theoretical communication complexity of our protocol is ≈3× better than the most communication efficient prior millionaire's protocol [22, 28, 31, 61, 62]. In terms of round complexity, our protocol executes in log $\ell$ rounds (e.g. 5 rounds for $\ell$ =32 bits); this is much better than prior works except for those based on Yao's garbled circuits that require optimal 2 rounds, but have prohibitively high communication complexity (see Table 1 for a detailed comparison).

TABLE 1

Comparison of communication with prior work for millionaire's problem. For our protocol, m is a parameter. For concrete bits of communication we use $\lambda$ = 128.

| Layer | Protocol | Comm. (bits) | Rounds |
|---|---|---|---|
| Millionaire's on $\{0, 1\}^\ell$ | GC [61, 62] | 4$\lambda \ell$ | 2 |
| | GMW³/GSV [28, 31] | ≈6$\lambda \ell$ | log $\ell$ + 3 |
| | SC3⁴ [22] | >3$\lambda \ell$ | ≈4 log* $\lambda$ |
| | This work (m = 4) | <$\lambda \ell$ + 14 $\ell$ | log $\ell$ |
| Millionaire's example $\ell$ = 32 | GC [61, 62] | 16384 | 2 |
| | GMW/GSV [28, 31] | 23140 | 8 |
| | SC3 [22] | 13016 | 15 |
| | This work (m = 7) | 2930 | 5 |
| | This work (m = 4) | 3844 | 5 |

Under GMW³, we state the communication numbers for GWM [31] for a depth-optimized circuit. The circuit that would give the best communication would still have a complexity of >2$\lambda \ell$ and would additionally pay an inordinate cost in terms of rounds, namely $\ell$. Further, under SC3⁴, Couteau [22] presented multiple protocols; we compare against the one that has the best communication complexity.

Using our protocol for millionaire's problem, we build new and efficient protocols for computing non-linear activations such as ReLU and Maxpool for both $\ell$-bit integers (i.e., $Z_L$, L=2$^\ell$) and general rings $Z_n$. Providing support for $\ell$-bit integers $Z_L$, as well as arbitrary rings $Z_n$, allow us to securely evaluate the linear layers (such as matrix multiplication and convolutions) using the approaches of Oblivious Transfer (OT) [8, 50] as well as Homomorphic Encryption (HE) [29, 42, 48], respectively. This provides our protocols great flexibility when executing over different network configurations. Since all prior work [42, 47, 48, 50] known to the inventors for securely computing these activations rely on Yao's garbled circuits [62], our protocols are much more efficient in both settings. Asymptotically, our ReLU protocol over $Z_L$, and $Z_n$ communicate 8× and 12× less bits than prior works [42, 47, 48, 50, 61, 62] (see Table 2 for a detailed comparison). Experimentally, our protocols are at least an order of magnitude more performant than prior protocols when computing ReLU activations at the scale of ML applications.

TABLE 2

Comparision of communication with Garbled Circuits for ReLU. We define η = ⌈log n⌉. For concrete bits of communication we use $\lambda$ = 128.

| Layer | Protocol | Comm. (bits) | Rounds |
|---|---|---|---|
| ReLU $Z_{2^\ell}$ | GC [61, 62] | 8$\lambda \ell$ − 4$\lambda$ | 2 |
| | This work | <$\lambda \ell$ + 18$\ell$ | log $\ell$ + 4 |
| ReLU for general $Z_n$ | GC [61, 62] | 18$\lambda$η − 6$\lambda$ | 2 |
| | This work | <$\frac{3}{2}\lambda$(η + 1) + 31η | log η + 4 |
| ReLU for | GC [61, 62] | 32256 | 2 |

TABLE 2-continued

Comparision of communication with Garbled Circuits for ReLU. We define η = ⌈log n⌉. For concrete bits of communication we use $\lambda$ = 128.

| Layer | Protocol | Comm. (bits) | Rounds |
|---|---|---|---|
| $Z_{2^\ell}, \ell = 32$ | This work | 3298 | 7 |
| ReLU for | GC [61, 62] | 72960 | 2 |
| $Z_n$, η = 32 | This work | 5288 | 9 |

Fixed-point arithmetic. The ML models used by all prior works known to the inventors on secure inference are expressed using fixed-point arithmetic; such models can be obtained from [38, 41, 44, 51]. A faithful implementation of fixed-point arithmetic is quintessential to ensure that the secure computation is correct, i.e., it is equivalent to the cleartext computation for all possible inputs. Given a secure inference task F (x,w), some prior works [44, 48-50, 60] give up on correctness when implementing division operations and instead compute an approximation F'(x,w). In fixed-point arithmetic, each multiplication requires a division by a power-of-2 and multiplications are used pervasively in linear-layers of DNNs. Moreover, layers like average-pool require division for computing means. Loss in correctness is worrisome as the errors can accumulate and F'(x,w) can be arbitrarily far from F (x,w). Recent work [48] has shown that even in practice the approximations can lead to significant losses in classification accuracy.

As our next contribution, we provide novel protocols to compute division by power-of-2 as well as division by arbitrary integers that are both correct and efficient. The inputs to these protocols can be encoded over both $\ell$-bit integers $Z_L$ as well as $Z_n$, for arbitrary n. The only known approach to compute division correctly is via garbled circuits which we compare with in Table 3. While garbled circuits based protocols require communication which is quadratic in $\ell$ or log n, our protocols are asymptotically better and incur only linear communication. Concretely, for average pool with 7×7 filters and 32-bit integers, our protocols have 54× less communication.

TABLE 3

Comparison of communication with Garbled Circuits for Avgpool$_d$. We define η = ⌈log n⌉ and δ = ⌈log(6 · d)⌉. For concrete bits of communication we use $\lambda$ = 128. Choice of d = 49 corresponds to average pool filter of size 7 × 7.

| Layer | Protocol | Comm. (bits) | Rounds |
|---|---|---|---|
| Avgpool$_d$ $Z_{2^\ell}$ | GC [61, 62] | 2$\lambda$($\ell^2$ + 5$\ell$ − 3) | 2 |
| | This work | <($\lambda$ + 21) · ($\ell$ + 3δ) | log($\ell$δ) + 4 |
| Avgpool$_d$ $Z_n$ | GC [61, 62] | 2$\lambda$(η² + 9η − 3) | 2 |
| | This work | < $\frac{3}{2}\lambda$(η + 34) · (η + 2δ) | log(ηδ) + 6 |
| Avgpool$_{49}$ $Z_{2^\ell}, \ell = 32$ | GC [61, 62] | 302336 | 2 |
| | This work | 5570 | 10 |
| Avgpool$_{49}$ $Z_n$, η = 32 | GC [61, 62] | 335104 | 2 |
| | This work | 7796 | 14 |

Scaling to practical DNNs. These efficient protocols, help us securely evaluate practical DNNs like SqueezeNet on ImageNet scale classification tasks in under a minute. In sharp contrast, all prior works on secure 2-party inference ([4, 6, 14, 18, 20, 23, 30, 42, 47, 48, 50, 54, 56]) has been limited to small DNNs on tiny datasets like MNIST and CIFAR. While MNIST deals with the task of classifying black and white handwritten digits given as 28×28 images into the classes 0 to 9, ImageNet tasks are much more complex: typically 224×224 colored images need to be classified into thousand classes (e.g., agaric, gyromitra, ptarmigan, etc.) that even humans can find challenging. Additionally, our work is the first to securely evaluate practical convolutional neural networks (CNNs) like ResNet50 and DenseNet121; these DNNs are at least an order of magnitude larger than the DNNs considered in prior work, provide over 90% Top-5 accuracy on ImageNet, and have also been shown to predict lung diseases from chest X-ray images [44, 64]. Thus, our work provides the first implementations of practical ML inference tasks running securely. Even on the smaller MNIST/CIFAR scale DNNs, our protocols require an order of magnitude less communication and significantly outperform the state-of-the-art [42, 48] in both LAN and WAN settings (see Table 5 in Section 7.2).

OT vs HE. Through our evaluation, we also resolve the OT vs HE conundrum: although the initial works on secure inference [47, 50] used OT-based protocols for evaluating convolutions, the state-of-the-art protocols [42, 48], which currently provide the best published inference latency, use HE-based convolutions. HE-based secure inference has much less communication than OT but HE's computation increases with the sizes of convolutions. Since practical DNNs have large Gigabyte-sized convolutions, at the onset of this work, it was not clear to us whether HE-based convolutions would provide us the best latency in practice.

To resolve this empirical question, we implement a cryptographic library PIE that provides two classes of protocols, $PIE_{OT}$ and $PIE_{HE}$. In $PIE_{OT}$, inputs are in $Z_L$ ($L=2^\ell$, for a suitable choice of $\ell$). Linear layers such as matrix multiplication and convolution are performed using OT-based techniques [8, 50], while the activations such as ReLU, Maxpool and Avgpool are implemented using our new protocols over $Z_L$. In $PIE_{HE}$, inputs are encoded in an appropriate prime field $Z_n$. Here, we compute linear layers using homomorphic encryption and the activations using our protocols over $Z_n$. In both $PIE_{OT}$ and $PIE_{HE}$ faithful divisions after linear layers are performed using our new protocols over corresponding rings. Next, we evaluate ImageNet-scale inference tasks with both $PIE_{OT}$ and $PIE_{HE}$. We observe that in a WAN setting, where communication is a bottleneck, HE-based inference is always faster and in a LAN setting OT and HE are incomparable.

1.2 Our Techniques

Millionaires'. Our protocol for securely computing the millionaire's problem (the bit x<y) uses the following observation (previously made in [28]). Let $x=x_1\|x_0$ and $y=y_1\|y_0$ (where $\|$ denotes concatenation and $x_1, y_1$ are strings of the same length). Then, x<y is the same as checking if either $x_1<y_1$ or $x_1=y_1$ and $x_0<y_0$. Now, the original problem is reduced to computing two millionaires' instances over smaller length strings ($x_1<y_1$ and $x_0<y_0$) and one equality test ($x_1=y_1$). By continuing recursively, one could build a tree all the way where the leaves are individual bits, at which point one could use 1-out-of-2 OT-based protocols to perform the comparison/equality. However, the communication complexity of this protocol is still quite large.

We make several important modifications to this approach. First, we modify the tree so that the recursion is done $\log(\ell/m)$ times to obtain leaves with strings of size m, for a parameter m. We then use 1-out-of-$2^m$ OT to compute the comparison/equality at the leaves. Second, we observe that by carefully setting up the receiver's and sender's messages in the OT protocols for leaf comparisons and equality, multiple 1-out-of-2 m OT instances can be combined to reduce communication. Next, recursing up from the leaves to the root, requires securely computing the AND functionality that uses Beaver bit triples [8] (This functionality takes as input shares of bits x, y from the two parties and outputs shares of x AND y to both parties). Here, the AND function takes as input shares of bits x, y from the two parties and output shares of x AND y to both parties. To the best of our knowledge, prior work required a cost of $2\lambda$ bits per triple [5, 24] (where $\lambda$ is the security parameter and typically 128). Now, since the same secret shared value is used in 2 AND instances, we construct correlated pairs of bit triples using 1-out-of-8 OT protocols [43] to reduce this cost to $\lambda+8$ bits (amortized) per triple. Finally, by picking m appropriately, we obtain a protocol for millionaires' whose concrete communication (in bits) is nearly 5 times better than prior work.

ReLU activation. The function ReLU(a) is defined as a·ReLU'(a), where ReLU'(a)=1 if a>0 and 0 otherwise. Hence, computing ReLU reduces to computing ReLU'(a). Let a be additively secret shared as $a_0$, $a_1$ over the appropriate ring. Note that a>0 is defined differently for $\ell$-bit integers (i.e., $Z_L$) and general rings $Z_n$. Over $Z_L$, ReLU'(a) =1⊕MSB(a), where MSB(a) is the most significant bit of a. Moreover, MSB(a)=MSB($a_0$)⊕MSB($a_1$)⊕carry. Here, carry=1 if $a_0'+a_1'\geq 2^{\ell-1}$, where $a_0'$, $a_1'$ denotes the integer represented by the lower $\ell-1$ bits of $a_0$, $a_1$. We compute this carry bit using a call to our millionaires' protocol. Over $Z_n$, ReLU'(a)=1 if $a\in[0, \lceil n/2\rceil)$. Given the secret shares $a_0$, $a_1$, this is equivalent to $(a_0+a_1)\in[0, \lceil n/2\rceil)\cup[n, \lceil 3n/2\rceil)$ over integers. While this can be naïvely computed by making 3 calls to the millionaires' protocol, we show that by carefully selecting the inputs to the millionaires' protocol, one can do this with only 2 calls.

Division and Truncation. As a technical result, we provide a correct decomposition of division of a secret ring element in $Z_L$ or $Z_n$ by a public integer into division of secret shares by the same public integer and correction terms (Theorem 4.1). These correction terms consist of multiple inequalities on secret values. As a corollary, we also get a much simpler expression for the special case of truncation, i.e., dividing $\ell$-bit integers by a power-of-2 (Corollary 4.2). We believe that the general theorem as well as the corollary can be of independent interest. Next, we give efficient protocols for both general division (used for Avgpool, Table 3) as well as division by a power-of-2 (used for multiplication in fixed-point arithmetic). The inequalities in the correction term are computed using our new protocol for millionaires' and the division of shares can be done locally by the respective parties. Our technical theorem is the key to obtaining secure implementation of DNN inference tasks that are bitwise equivalent to cleartext fixed-point execution.

1.3 Organization

We begin with the details on security and cryptographic primitives used in Section 2 on preliminaries. In Section 3 we provide our protocols for millionaires' (Section 3.1) and ReLU' (Section 3.2, 3.3), over both $Z_L$, and general ring $Z_n$. In Section 4, we present our protocols for general division, as well as the special case of division by power-of-2. We describe the various components that go into a neural network inference algorithm in Section 5 and show how to construct secure protocols for all these components given our protocols from Sections 3 and 4. We present our implementation details in Section 6 and our experiments in Section 7. We conclude discussion of these general principles in Section 8. Section 9 describes a computing system that may employ the principles described herein. Section 10 is an appendix. Section 11 is a bibliography.

2. Preliminaries

Notation. Let $\lambda$ be the computational security parameter and $\text{negl}(\lambda)$ denote a negligible function in $\lambda$. For a set W, $$w \xleftarrow{\$} W$$

denotes sampling an element w, uniformly at random from W. $[\ell]$ denotes the set of integers $\{1, \ldots, \ell\}$. Let $1\{b\}$ denote the indicator function that is 1 when b is true and 0 when b is false.

2.1 Threat Model and Security

We provide security in the simulation paradigm [19, 31, 46] against a static semi-honest probabilistic polynomial time (PPT) adversary $\mathcal{A}$. That is, a computationally bounded adversary $\mathcal{A}$ corrupts either $P_0$ or $P_1$ at the beginning of the protocol and follows the protocol specification honestly. Security is modeled by defining two interactions: a real interaction where $P_0$ and $P_1$ execute the protocol in the presence of $\mathcal{A}$ and the environment $\mathcal{Z}$ and an ideal interaction where the parties send their inputs to a trusted functionality that performs the computation faithfully. Security requires that for every adversary $\mathcal{A}$ in the real interaction, there is an adversary $\mathcal{S}$ (called the simulator) in the ideal interaction, such that no environment $\mathcal{Z}$ can distinguish between real and ideal interactions. Many of our protocols invoke multiple sub-protocols and we describe these using the hybrid model. This is similar to a real interaction, except that sub-protocols are replaced by the invocations of instances of corresponding functionalities. A protocol invoking a functionality $\mathcal{F}$ is said to be in "$\mathcal{F}$-hybrid model."

2.2 Cryptographic Primitives

2.2.1 Secret Sharing Schemes.
Throughout this work, we use 2-out-of-2 additive secret sharing schemes over different rings [12, 58]. The 3 specific rings that we consider are the field $\mathbb{Z}_2$, the ring $\mathbb{Z}_L$, where $L=2^\ell$ ($\ell=32$, typically), and the ring $\mathbb{Z}_n$, for a positive integer n (this last ring includes the special case of prime fields used in the works of [42, 48]). We let $\text{Share}^L(x)$ denote the algorithm that takes as input an element x in $\mathbb{Z}_L$, and outputs shares over $\mathbb{Z}_L$, denoted by $\langle x \rangle_0^L$ and $\langle x \rangle_1^L$. Shares are generated by sampling random ring elements $\langle x \rangle_0^L$ and $\langle x \rangle_1^L$, with the only constraint that $\langle x \rangle_0^L + \langle x \rangle_1^L = x$ (where + denotes addition in $\mathbb{Z}_L$). Additive secret sharing schemes are perfectly hiding, i.e., given a share $\langle x \rangle_0^L$ or $\langle x \rangle_1^L$, the value x is completely hidden. The reconstruction algorithm $\text{Reconst}^L(\langle x \rangle_0^L, \langle x \rangle_1^L)$ takes as input the two shares and outputs $x = \langle x \rangle_0^L + \langle x \rangle_1^L$. Shares (along with their corresponding Share( ) and Reconst( ) algorithms) are defined in a similar manner for $\mathbb{Z}_2$ and $\mathbb{Z}_n$ with superscripts B and n, respectively. We sometimes refer to shares over $\mathbb{Z}_L$ and $\mathbb{Z}_n$ as arithmetic shares and shares over $\mathbb{Z}_2$ as boolean shares.

2.2.2 Oblivious Transfer. Let $$\binom{k}{1} - OT_\ell$$

denote the 1-out-of-k Oblivious Transfer (OT) functionality [17] (which generalizes 1-out-of-2 OT [26, 53]). The sender's inputs to the functionality are the k strings $m_1, \ldots, m_k$, each of length $\ell$ and the receiver's input is a value $i \in [k]$. The receiver obtains $m_i$ from the functionality and the sender receives no output. We use the protocols from [43], which are an optimized and generalized version of the OT extension framework proposed in [9, 40]. This framework allows the sender and receiver, to "reduce" $\lambda^c$ number of oblivious transfers to $\lambda$ "base" OTs in the random oracle model [11] (for any constant $c>1$). We also use the notion of correlated 1-out-of-2 OT [5], denoted by $$\binom{k}{1} - COT_\ell.$$

In our context, this is a functionality where the sender's input is a ring element x and the receiver's input is a choice bit b. The sender receives a random ring element r as output and the receiver obtains either r or x+r as output depending on b. The protocols for $$\binom{k}{1} - OT_\ell \quad [43]$$

and $$\binom{2}{1} - COT_\ell \quad [5]$$

execute in 2 rounds and have total communication of $2\lambda + k\ell$ and $\lambda + \ell$, respectively. Moreover, simpler $$\binom{2}{1} - OT_\ell$$

has a communication of $\lambda + 2\ell$ bits [5, 40] (The protocol of $$\binom{k}{1} - OT_\ell \quad [43]$$

incurs a communication cost of $\lambda + k\ell$. However, to achieve the same level of security, their security parameter needs to be twice that of $$\binom{2}{1} - COT_\ell.$$

In concrete terms, therefore, we write the cost as $2\lambda + k$).

2.2.3 Multiplexer and B2A conversion.
The functionality $\mathcal{F}_{MUX}{}^n$ takes as input arithmetic shares of a over n and boolean shares of choice bit c from $P_0, P_1$, and returns shares of a if c=1, else returns shares of 0 over the same ring. A protocol for $\mathcal{F}_{MUX}{}^n$ can easily be implemented by 2 simultaneous calls to $$\binom{2}{1} - OT_\eta$$

and communication complexity is $2(\lambda + 2\eta)$, where $\eta = \lceil \log n \rceil$.

The functionality $\mathcal{F}_{B2A}{}^n$ (for boolean to arithmetic conversion) takes boolean (i.e., over $\mathbb{Z}_2$) shares as input and gives out arithmetic (i.e., over $\mathbb{Z}_n$) shares of the same value as output. It can be realized via one call to $$\binom{2}{1}\text{-COT}_\eta$$

and hence, its communication is $\lambda+\eta$. For completeness, we provide the protocols realizing $\mathcal{F}_{MUX}^n$ as well as $\mathcal{F}_{B2A}^n$ formally in Appendix A.3 and Appendix A.4, respectively.

2.2.4 Homomorphic Encryption. A homomorphic encryption of x allows computing encryption of f (x) without the knowledge of the decryption key. In this work, we require an additively homomorphic encryption scheme that supports addition and scalar multiplication, i.e. multiplication of a ciphertext with a plaintext. We use the additively homomorphic scheme of BFV [16, 27] (the scheme used in the recent works of Gazelle [42] and Delphi [48]) and use the optimized algorithms of Gazelle for homomorphic matrix-vector products and homomorphic convolutions. The BFV scheme uses the batching optimization [45, 59] that enables operation on plaintext vectors over the field $\mathbb{Z}_n$, where n is a prime plaintext modulus of the form 2KN+1, K is some positive integer and N is scheme parameter that is a power-of-2.

3. Millionaire's and ReLU' Protocols

In this section, we provide our protocols for millionaire's problem and ReLU'(a) (defined to be 1 if a>0 and 0 otherwise) when the inputs are $\ell$ bit signed integers as well as elements in general rings of the form $\mathbb{Z}_n$ (including prime fields). Our protocol for Millionaire's problem invokes instances of $\mathcal{F}_{AND}$ that takes as input Boolean shares of values $x, y \in \{0, 1\}$ and returns boolean shares of $x \wedge y$. We discuss efficient protocols for $\mathcal{F}_{AND}$ in Appendix A.1 and A.2

3.1 Protocol for Millionaires'

In the Yao Millionaires' problem, party $P_0$ holds x and party $P_1$ holds y and they wish to learn boolean shares of $1\{x<y\}$. FIG. 1 illustrates an environment 100 in which the learning occurs and includes first party computing system 101 owned by $P_0$ and a second party computing system 102 owned by $P_1$. The first party computing system 101 holds input x, whereas the second party computing system 102 holds input y. Each of the computing systems 101 and 102 may be structured as described below for the computing system 400 of FIG. 4.

As represented by arrow 121, the first party computing system 101 provides its input x to the two-party computation module 110. Also, as represented by arrow 122, the second party computing system 102 provides its input y to the two-party computing module 110. As represented by arrows 131 and 132, the two-party computation module 110 outputs a first share 111 of the value $1\{x<y\}$ to the first party computing system 101, and outputs a second share 112 of the value $1\{x<y\}$ to the second party computing system 102. At this point, the first and second party computing systems 101 and 102 could not independently reconstruct the value 140 ($1\{x<y\}$) unless they acquired the share they do not have from the other party. Thus, unless the two computing systems 101 and 102 were to share their shares (as represented by arrows 141 and 142), the result of the computation remains secure.

Here, x and y are $\ell$-bit unsigned integers. We denote this functionality by $\mathcal{F}_{MILL}^\ell$. Our protocol for $\mathcal{F}_{MILL}^\ell$ builds on the following observation (Equation 1) that was also used in [28].

$$1\{x<y\}=1\{x_1<y_1\}\oplus(1\{x_1=y_1\}\wedge 1\{x_0<y_0\}), \quad (1)$$

where, $x=x_1\|x_0$ and $y=y_1\|y_0$.

Figure 2:
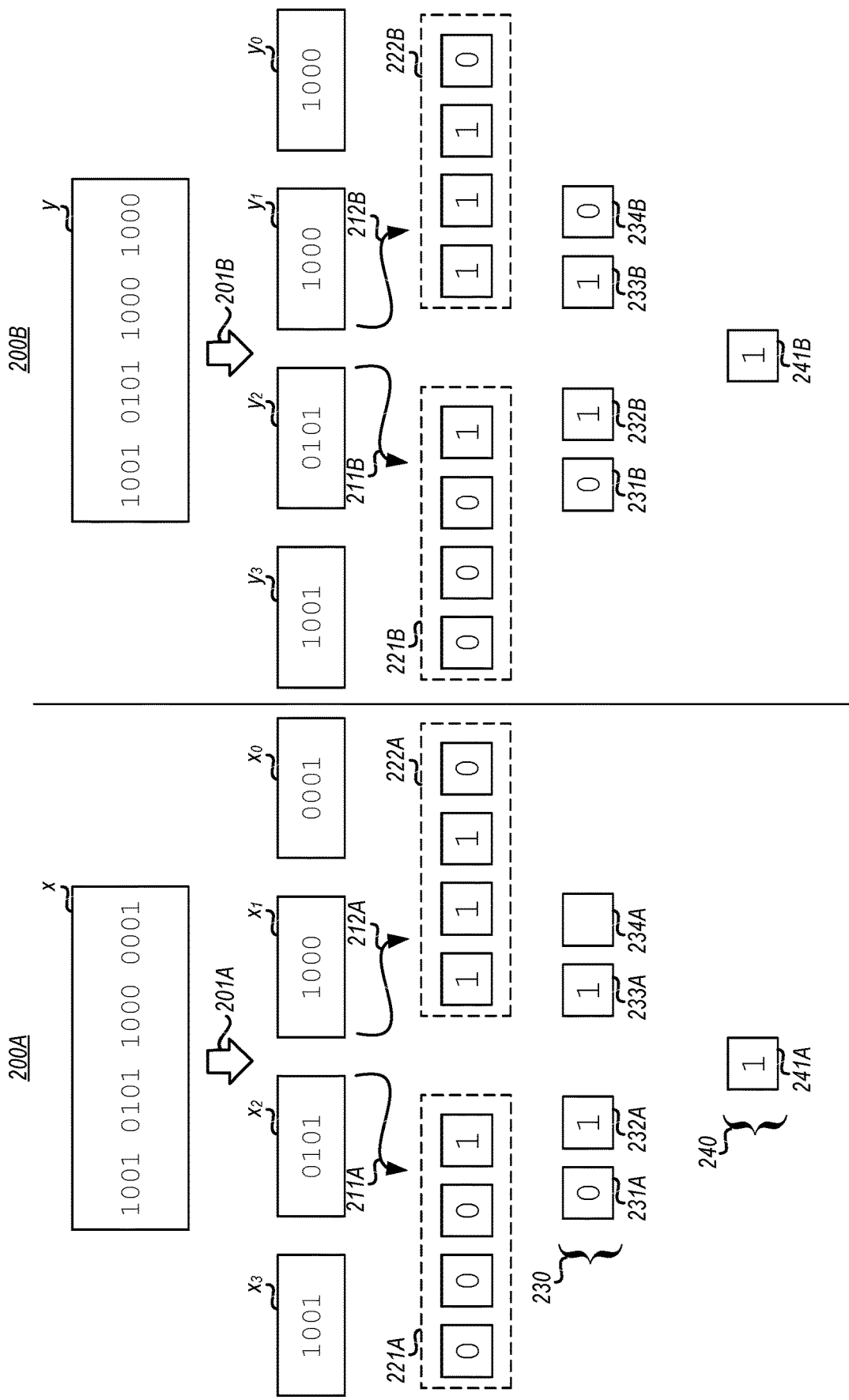
FIG. 2A illustrates a process performed by the first party computing system to compute its share of $1\{x_B < y_B\}$.
FIG. 2B illustrates a process performed by the second party computing system to compute its share of $1\{x_B < y_B\}$.
Figure 3:
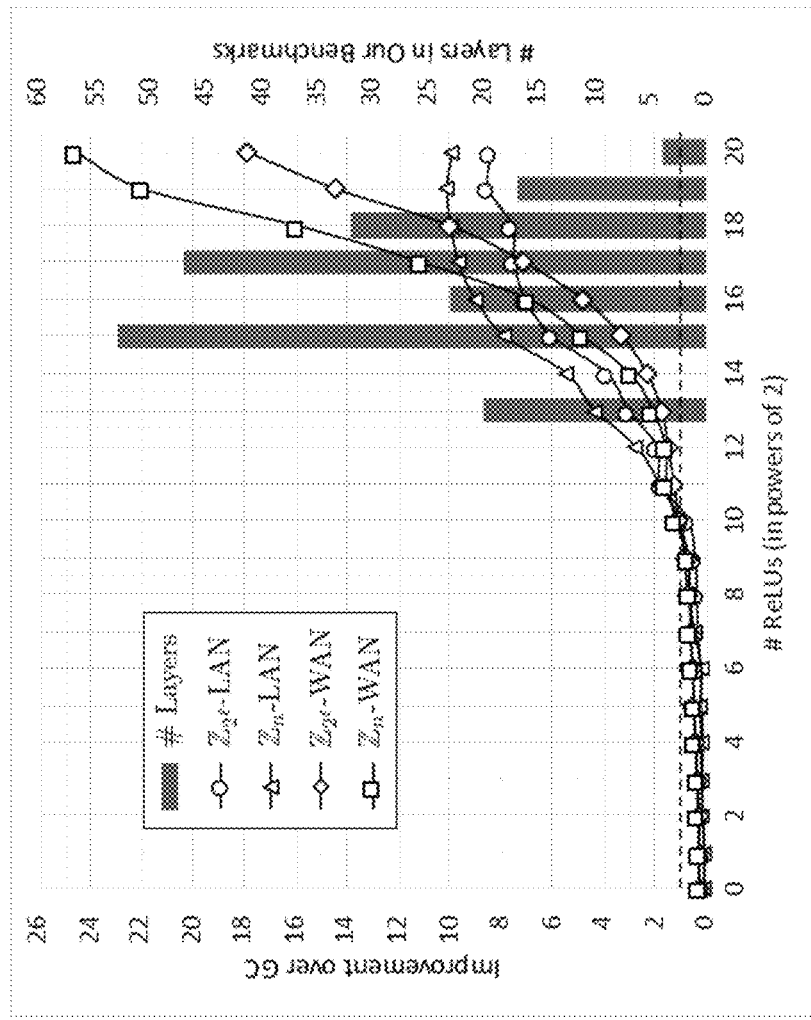
FIG. 3 shows the improvement of our ReLU the protocols described herein over garbles circuits in both LAN and WAN settings.

Let m be a parameter and $M=2^m$. First, for ease of exposition, we consider the special case when m divides $\ell$ and $q=\ell/m$ is a power of 2. FIG. 2 illustrates the an general process flow that each of the two computing systems would employ. We describe our protocol for millionaire's problem in this setting formally in Algorithm 1. We use Equation 1 above, recursively log q times to obtain q leaves of size m bits. For example, That is, let $x=x_{q-1}\| \ldots \|x_0$ and $y=y_{q-1}\| \ldots \|y_0$ (where every $x_1, y_1 \in \{0, 1\}^m$).

Now, we compute the shares of the inequalities and equalities of strings at the leaf level using $$\binom{M}{1}\text{-}OT1$$

(steps 9 and 10, resp.). Next, we compute the shares of the inequalities (steps 14 & 15) and equalities (step 16) at each internal node upwards from the leaf using Equation 1. Value of inequality at the root gives the final output.

---

Algorithm 1 Millionaires', $\Pi_{MILL}^{\ell,m}$:

Input: $P_0, P_1$ hold $x \in \{0, 1\}^\ell$ and $y \in \{0, 1\}^\ell$, respectively.
Output: $P_0, P_1$ learn $\langle 1\{x<y\}\rangle_0^B$ and $\langle 1\{x<y\}\rangle_1^B$, respectively.
 1: $P_0$ parses its input as $x = x_{q-1} \| \ldots \| x_0$ and $P_1$ parses its input as $y = y_{q-1} \| \ldots \| y_0$, where $x_i, y_i \in \{0, 1\}^m$, $q = \ell/m$.
 2: Let $M = 2^m$.
 3: for $j = \{0, \ldots, q-1\}$ do
 4:   $P_0$ samples $\langle lt_{0,j}\rangle_0^B, \langle eq_{0,j}\rangle_0^B \xleftarrow{\$} \{0, 1\}$.
 5:   for $k = \{0, \ldots, M-1\}$ do
 6:     $P_0$ sets $s_{j,k} = \langle lt_{0,j}\rangle_0^B \oplus \{x_j < k\}$.
 7:     $P_0$ sets $t_{j,k} = \langle eq_{0,j}\rangle_0^B \oplus \{x_j = k\}$.
 8:   end for
 9:   $P_0$ & $P_1$ invoke an instance of $\binom{M}{1}\text{-}OT_1$
      where $P_0$ is the sender with inputs $\{s_{j,k}\}_k$
      and $P_1$ is the receiver with input $y_j$. $P_1$ sets its output as $\langle lt_{0,j}\rangle_1^B$.

-continued

Algorithm 1 Millionaires', $\pi_{Mill}^{\ell,m}$:

10:    $P_0$ & $P_1$ invoke an instance of $\binom{M}{1}$-$OT_1$ where $P_0$ is the sender with inputs $\{t_{j,k}\}_k$ and $P_1$ is the receiver with input $y_j$. $P_1$ sets its output as $\langle eq_{0,j}\rangle_1^B$.

11:   end for
12:   for i= {1, . . . , log q} do
13:     for j = {0, . . . , (q/$2^i$) − 1} do
14:       For b ∈ {0, 1}, $P_b$ invokes $\mathcal{F}_{AND}$ with inputs $\langle lt_{i-1,2j}\rangle_b^B$ and $\langle eq_{i-1,2j+1}\rangle_b^B$ to learn output $\langle temp\rangle_b^B$.
15:       $P_b$ sets $\langle lt_{i,j}\rangle_b^B = \langle lt_{i-1,2j+1}\rangle_b^B \oplus \langle temp\rangle_b^B$.
16:       For b ∈ {0, 1}, $P_b$ invokes $\mathcal{F}_{AND}$ with inputs $\langle eq_{i-1,2j}\rangle_b^B$ and $\langle eq_{i-1,2j+1}\rangle_b^B$ to learn output $\langle eq_{i,2}\rangle_b^B$.
17:     end for
18:   end for
19:   For b ∈ {0, 1}, $P_b$ outputs $\langle lt_{log\,n,0}\rangle_b^B$.

Let us take a concrete example to further clarify with respect to FIGS. 2A and 2B. FIG. 2A shows the processing associated with the first party computing system. FIG. 2B shows the processing associated with the second party computing system. Suppose that the length of the input f is 16, and that the length of each leaf string m will be 4. Here M will be $2^4$ or 16. Furthermore, q=$\ell$ /m, which equals 16/4 or 4. Equation 1 will be performed recursively $log_2$ q times, or in other words $log_2$ 4 times, or in other words twice. This is the special cases since m divides l, and since q is a power of 2 ($2^2$). Now let us discuss an example input x=1001010110000001, and an example input y=1001010110001000.

In line 1 of Algorithm 1, and referring to the arrow 201A of FIG. 2A, $P_0$ parses x to obtain $x_3$=1001, $x_2$=0101, $x_1$=1000, and $x_0$=0001. Also in line 1 and referring to the arrow 201B of FIG. 2B, $P_1$ parses y to obtain $y_3$=1001, $y_2$=0101, $y_1$=1000, and $y_0$=1000. Note that the value of 1{x<y} is binary 1 since x is indeed less than y, but neither party knows this at least at this stage, and neither party will ever know this if this is not the final output of the garbled circuit representing the DNN. Instead, each party will only learn their respective Boolean share of 1{x<y}.

In line 9, using $$\binom{16}{1}-OT_1$$

each party learns their Boolean share of 1{$x_3$<$y_3$}, 1{$x_2$<$y_2$}, 1{$x_1$<$y_1$}, and 1{$x_0$<$y_0$}, or in other words, their respective Boolean share of 0, 0, 0, and 1 since only 1{$x_0$<$y_0$} is equal to one. As represented by arrow 211A of FIG. 2A, the first party computing system learns its shares 221A of 1{$x_3$<$y_3$}, 1{$x_2$<$y_2$}, 1{$x_1$<$y_1$}, and 1{$x_0$<$y_0$}. As represented by arrow 211B of FIG. 2B, the second party computing system also learns its shares 221B of 1{$x_3$<$y_3$}, 1{$x_2$<$y_2$}, 1{$x_1$<$y_1$}, and 1{$x_0$<$y_0$}. Again, each party only knows Boolean shares of these values, and thus continues to be obvious as to the truth of each of these inequalities.

In line 10, each party uses $$\binom{16}{1}-OT_{1\,to}$$

to learn their Boolean share of 1{$x_3$=$y_3$}, 1{$x_2$=$y_2$}, 1{$x_1$=$y_1$} and 1{$x_0$=$y_0$}, or in other words their Boolean share of 1, 1, 1, 0, since only $x_0$=$y_0$ is false, and since the leaf strings $x_3$, $x_2$ and $x_1$ are each equal to the respective leaf strings $y_3$, $y_2$ and $y_1$. As represented by arrow 212A of FIG. 2A, the first party computing system learns its shares 222A of 1{$x_3$=$y_3$}, 1{$x_2$=$y_2$}, 1{$x_1$=$y_1$} and 1{$x_0$=$y_0$}. As represented by arrows 212B of FIG. 2B, the second party computing system learns its shares 222B of 1{$x_3$=$y_3$}, 1{$x_2$=$y_2$}, 1{$x_1$=$y_1$} and 1{$x_0$=$y_0$}. Again, each party only knows Boolean shares of these values, and thus continues to be obvious as to the truth of each of these inequalities.

In the first recursion 230 (when i is equal to 1), there is an inequality and equality to be learned for $x_{32}$ and $y_{32}$ (when j is equal to 0, and where $x_{32}$=$x_3$||$x_2$ and $y_{32}$=$y_3$||$y_2$), and an equality and inequality to be learned for $x_{10}$ and $y_{1\_}$ (when j is equal to 1, and where $x_{10}$=$x_1$||$x_1$ and $y_{10}$=$y_1$||$y_1$).

The first iteration will now be described with respect to the example. In this example $x_{32}$ is 10010101, and $y_{32}$ is also 10010101. Thus, we expect 1{$x_{32}$<$y_{32}$} to be 0. Applying Equation 1 to inputs $y_3$. $y_2$, $x_3$, and $x_2$, each party learns their respective Boolean shares 231A and 231B of 1{$x_{32}$<$y_{32}$}, which is 0⊕(1∧0), or 0⊕0, or 0. Applying $\mathcal{F}_{AND}$ to these same inputs, each party learns their respective shares 233A and 233B of 1{$x_{32}$=$y_{32}$}, which is 1. Also in this example $x_{10}$ is 10000001, and $y_{10}$ is also 10001000. Thus, we expect 1{$x_{10}$<$y_{10}$} to be 1. Applying Equation 1 to inputs $y_1$. $y_0$, $x_1$, and $x_1$, each party learns their respective Boolean shares 232A and 232B of 1{$x_{10}$<$y_{10}$}, which is 0⊕(1∧1), or 0⊕1, or 1. Applying $\mathcal{F}_{AND}$ to these same inputs, each party learns their respective shares 234A and 234B of 1{$x_{10}$=$y_{10}$}, which is 0. In the second iteration, the value 1{x<y} should be 1 since x is less than y. Applying Equation 1 to inputs $y_{32}$. $y_{10}$, $x_{32}$, and $x_{10}$, each party learns their respective Boolean shares 241A and 241B of 1{x<y}, which is 0⊕(1∧1), or 0⊕1, or 1.

Correctness and security. Correctness is shown by induction on the depth of the tree starting at the leaves. First, by correctness of $$\binom{M}{1}-OT_1$$

in step 9, $\langle \mathrm{lt}_{0,j}\rangle_1^B = \langle \mathrm{lt}_{0,j}\rangle_0^B \oplus 1\{x_j < y_j\}$. Similarly, $\langle \mathrm{eq}_{0,i}\rangle_1^B = \langle \mathrm{eq}_{0,i}\rangle_0^B \oplus 1\{x_j = y_j\}$. This proves the base case. Let $q_i = q/2^i$. Also, for level i of the tree, parse $x = x^{(i)} = x_{q_i-1}^{(i)} \| \ldots x_0^{(i)}$ and $y = y^{(i)} = y_{q_i-1}^{(i)} \| \ldots y_0^{(i)}$. Assume that for i it holds that $\mathrm{lt}_{i,j} = \langle \mathrm{lt}_{i,j}\rangle_0^B \oplus \langle \mathrm{lt}_{i,j}\rangle_1^B = 1\{x_j^{(i)} < y_j^{(i)}\}$ and $\langle \mathrm{eq}_{i,j}\rangle_0^B \oplus \langle \mathrm{eq}_{i,j}\rangle_1^B = 1\{x_j^{(i)} = y_j^{(i)}\}$ for all $j \in \{0, \ldots, q_{i-1}\}$. Then, we prove the same for i+1 as follows: By correctness of $\mathcal{F}_{AND}$, for $j \in \{0, \ldots, q_{i+1}-1\}$, $\langle \mathrm{lt}_{i+1,j}\rangle_0^B \oplus \langle \mathrm{lt}_{i+1,j}\rangle_1^B = \mathrm{lt}_{i,2j+1} \oplus (\mathrm{lt}_{i,2j} \wedge \mathrm{eq}_{i,2j+1}) = 1\{x_{2j+1}^{(i)} < y_{2j+1}^{(i)}\} \oplus (1\{x_{2j}^{(i)} < y_{2j}^{(i)}\} \wedge 1\{x_{2j+1}^{(i)} = y_{2j+1}^{(i)}\}) = 1\{x_j^{(i+1)} \leq y_j^{(i+1)}\}$ (using Equation 1). The induction step for $\mathrm{eq}_{i+1,j}$ holds in a similar manner, thus proving correctness. Given uniformity of $\langle \mathrm{lt}_{0,j}\rangle_0^B$, $\langle \mathrm{eq}_{0,j}\rangle_0^B$ for all $j \in \{0, \ldots, q-1\}$, security follows easily in the $$\left(\binom{M}{1}\right) - OT_1,$$

$\mathcal{F}_{AND}$)-hybrid.

General case. When m does not divide $\ell$ and $q = \lceil \ell/m \rceil$ is not a power of 2, we make the following modifications to the protocol. Since m does not divide $\ell$, $x_{q-1} \in \{0, 1\}^r$, where $r = \ell \bmod m$ (Note that $r = m$ when $m | \ell$). When doing the compute for $x_{q-1}$ and $y_{q-1}$, we perform a small optimization and use $$\binom{R}{1} - OT1$$

in steps 9 and 10, where $R = 2^r$. Second, since q is not a power of 2, we do not have a perfect binary tree of recursion and we need to slightly change our recursion/tree traversal. In the general case, we construct maximal possible perfect binary trees and connect the roots of the same using the relation in Equation 1. Let $\alpha$ be such that $2^\alpha < q \leq 2^{\alpha+1}$. Now, our tree has a perfect binary sub-tree with $2\alpha$ leaves and we have remaining $q' = q - 2^\alpha$ leaves. We recurse on q'. In the last step, we obtain our tree with q leaves by combining the roots of perfect binary tree with $2^\alpha$ leaves and tree with q' leaves using Equation 1. Note that value at the root is computed using $\lceil \log q \rceil$ sequential steps starting from the leaves.

Again, let us take a concrete example to further clarify. Suppose that the length of the input $\ell$ is 11, and that the length of each leaf string m will be 4. As an example suppose that input $x = 10110000001$, and input $y = 10110001000$. Here, m does not divide $\ell$. Accordingly, $x_{q-1} \in \{0, 1\}^r$, where $r = \ell \bmod m$ (Note that $r = m$ when $m | \ell$). Accordingly, $x_2$ is equal to 101, and $y_2$ is equal to 101. q is equal to 3, and thus there is no $x_3$ and $y_3$. $x_1$, $x_0$, $y_1$ and $y_2$ are the same as in the previous example. Here, when doing the compute for $x_2$ and $y_2$, the Boolean shares of the inequality and equality are each learned using uses $$\binom{8}{1} - OT_1$$

instead of uses $$\binom{16}{1} - OT_1.$$

In the first iteration, the Boolean shares the equalities and inequalities of $x_2$ and $y_2$ are calculated However, the equalities and inequalities for $x_{10}$ and $y_{10}$ are still calculated. Then, in the second recursion, the Boolean shares of the inequality for x and y is calculated using inputs, $x_2$ and $x_{10}$, and $y_2$ and $y_{10}$.

3.1.1 Optimizations. We reduce the concrete communication complexity of our protocol using the following optimizations that are applicable to both the special and the general case.

Combining two $$\binom{M}{1} - OT_1$$

calls into one $$\binom{M}{1} - OT_2:$$

Since the input of $P_1$ (OT receiver) to $$\binom{M}{1} - OT_1$$

in steps 9 and 10 is the same, i.e. $y_j$, we can collapse these steps into a single call to $$\binom{M}{1} - OT_2$$

where $P_0$ and $P_1$ input $\{(s_{j,k} \| t_{j,k})\}_k$ and $y_j$, respectively. $P_1$ sets its output as $(\langle \mathrm{lt}_0 \rangle_1^B \| \langle \mathrm{eq}_{0,j}\rangle_1^B)$. This reduces the cost from $2(2\lambda+M)$ to $(2\lambda+2M)$.

Realizing $\mathcal{F}_{AND}$ efficiently: It is known that $\mathcal{F}_{AND}$ can be realized using Beaver bit triples [8]. In prior works [5, 24], generating a bit triple costs $2\lambda$ bits. For our protocol, we observe that the 2 calls to $\mathcal{F}_{AND}$ in steps 14 and 16 have a common input, $\langle \mathrm{eq}_{i-1,2j+1}\rangle_b^B$. Hence, we optimize communication of these steps by generating correlated bit triples ($\langle d \rangle_b^B, \langle e \rangle_b^B, \langle f \rangle_b^B$) and ($\langle d' \rangle_b^B, \langle e \rangle_b^B, \langle f' \rangle_b^B$) for $b \in \{0, 1\}$, such that $d \wedge e = f$ and $d' \wedge e = f'$. Next, we use $$\binom{8}{1} - OT_2$$

to generate one such correlated bit triple (Appendix A.2) with communication $2\lambda+16$ bits, giving the amortized cost of $\lambda+8$ bits per triple. Given correlated bit triples, we need 6 additional bits to compute both $\mathcal{F}_{AND}$ calls.

Removing unnecessary equality computations: As observed in [28], the equalities computed on lowest significant bits are never used. Concretely, we can skip computing the values $\mathrm{eq}_{i,0}$ for $i \in \{0, \ldots, \log q\}$. Once we do this optimization, we only need a single call to $\mathcal{F}_{AND}$ instead of 2 correlated calls for the leftmost branch of the tree. We use the $$\binom{16}{1} - OT_2 \rightarrow 2 \times \binom{4}{1} - OT_1$$

reduction to generate 2 regular bit triples (Appendix A.1) with communication of $2\lambda+32$ bits. This gives us amortized communication of $\lambda+16$ bits per triple. This is $\approx 2\times$ improvement over $2\lambda$ bits required in prior works [5, 24]. Given a bit triple, we need 4 bits to realize $\mathcal{F}_{AND}$. This reduces the total communication by M (for the leaf) plus $(\lambda+2)\cdot\lceil \log q \rceil$ (for leftmost branch) bits.

3.1.2 Communication Complexity. In our protocol, we communicate in protocols for OT (steps 9&10) and $\mathcal{F}_{AND}$ (steps 14&16). With above optimizations, we need 1 call to $$\binom{M}{1} - OT_1,$$

(q−2) calls to $$\binom{M}{1} - OT_2$$

and 1 call to $$\binom{R}{1} - OT_2$$

which cost $(2\lambda+M)$, $((q-2)\cdot(2\lambda+2M)$ (and $(2\lambda+2R)$ bits, respectively. In addition, we have $\lceil \log q \rceil$ invocations of $\mathcal{F}_{AND}$ and $(q-1-\lceil \log q \rceil)$ invocations of correlated $\mathcal{F}_{AND}$. These require communication of $(\lambda+20)\cdot\lceil \log q \rceil$ and $(2\lambda+22)\cdot(q-1-\lceil \log q \rceil)$ bits. This gives us total communication of $\lambda(4q-\lceil \log q \rceil-2)+M(2q-3)+2R+22(q-1)-2\lceil \log q \rceil$ bits. Using this expression for $\ell=32$ we get the least communication for m=7 (Table 1). We note that there is a trade-off between communication and computational cost of OTs used and we discuss our choice of m for our experiments in Section 6.

3.2 Protocol for ReLU' for $\ell$-Bit Integers

Here, we describe our protocol for $F_{DReLU}^{int,\ell}$ that takes as input arithmetic shares of a and returns boolean shares of ReLU'(a) (DReLU stands for derivative of ReLU, i.e., ReLU'). Note that ReLU'(a)=(1⊕MSB(a)), where MSB(a) is the most significant bit of a. Let arithmetic shares of $a \in \mathbb{Z}_L$ be $\langle a \rangle_0^L = msb_0 \| x_0$ and $\langle a \rangle = msb_1 \| x_1$ such that $msb_0, msb_1 \in \{0, 1\}$. We compute the boolean shares of MSB(a) as follows: Let carry=$1\{(x_0+x_1) > 2^{\ell-1}-1\}$. Then, MSB(a)=$msb_0 \oplus msb_1 \oplus$carry. We compute boolean shares of carry by invoking an instance of $\mathcal{F}_{MILL}^{\ell-1}$.

---

Algorithm 2 $\ell$-bit integer ReLU' $\Pi_{DReLU}^{int,\ell}$:
Input: $P_0$, $P_1$ hold$\langle a \rangle_0^L$ and$\langle a \rangle_1^L$, respectively.
Output: $P_0$, $P_1$ get$\langle ReLU'(a) \rangle_0^B$ and$\langle ReLU'(a) \rangle_1^B$.
1: $P_0$ parses its input as$\langle a \rangle_0^L = msb_0 \| x_0$ and $P_1$ parses its input as$\langle a \rangle_1^L = msb_1 \| x_1$, s.t. $b \in \{0, 1\}$, $msb_b \in \{0, 1\}$, $x_b \in \{0, 1\}^{\ell-1}$.
2: $P_0$ & $P_1$ invoke an instance of $\mathcal{F}_{MILL}^{\ell-1}$, where $P_0$'s input is $2^{\ell-1}-1-x_0$ and $P_1$'s input is $x_1$. For $b \in \{0, 1\}$, $P_b$ learns$\langle carry \rangle_b^B$.
3: For $b \in \{0, 1\}$, $P_b$ sets$\langle ReLU' \rangle_b^B = msb_b \oplus \langle carry \rangle_b^B \oplus b$.

---

Correctness and security. By correctness of $\mathcal{F}_{MILL}^{\ell-1}$, Reconst$^B$ $(\langle carry \rangle)_0^B$, $(\langle carry \rangle_1^B)$=$1\{2^{\ell-1}-1-x_0) < x_1\}$=$1\{(x_0+x_1) > 2^{\ell-1}-1\}$. Also, Reconst$^B$ $(\langle ReLU' \rangle)_0^B$, $\langle ReLU' \rangle_1^B$)=$msb_0 \oplus msb_1 \oplus$carry$\oplus 1$=MSB(a)$\oplus 1$. Security follows trivially in the $\mathcal{F}_{MILL}^{\ell-1}$ hybrid.

Communication complexity In Algorithm 2, we communicate the same as in $\Pi_{MILL}^{\ell-1}$; that is $<(\lambda+14)(\ell-1)$ by using m=4.

3.3 Protocol for ReLU' for General $\mathbb{Z}_n$

We describe a protocol for $\mathcal{F}_{DReLU}^{ring,n}$ that takes arithmetic shares of a over $\mathbb{Z}_n$ as input and returns boolean shares of ReLU'(a). For integer rings $\mathbb{Z}_n$, ReLU'(a)=1 if $a < \lceil n/2 \rceil$ and 0 otherwise. Note that this includes the case of prime fields considered in the works of [42, 48]. We first describe a (simplified) protocol for ReLU' in $\mathbb{Z}_n$, in Algorithm 3 with protocol logic as follows: Let arithmetic shares of $a \in \mathbb{Z}_n$ be $\langle a \rangle_0^n$, and $\langle a \rangle_1^n$. Define wrap=$1\{\langle a \rangle_0^n + \langle a \rangle_n^1 > n-1\}$, lt=$1\{\langle a \rangle_0^n + \langle a \rangle_1^n > (n-1)/2\}$ and rt=$1\{\langle a \rangle_0^n + \langle a \rangle_1^n > n+(n-1)/2\}$. Then, ReLU'(a) is (1⊕lt) if wrap=0, else it is (1⊕rt). In Algorithm 3, steps 1, 2, 3, compute these three comparisons using $\mathcal{F}_{MILL}$. Final output can be computed using an invocation of $\mathcal{F}_{MUX}^2$.

---

Algorithm 3 Simple Integer ring ReLU' $\Pi_{DReLU^{simple}}^{ring, n}$:

Input: $P_0$, $P_1$, hold$\langle a \rangle_0^n$ and$\langle a \rangle_1^n$, respectively, where $a \in \mathbb{Z}_n$.
Output: $P_0$, $P_1$ get$\langle ReLU'(a) \rangle_0^B$ and$\langle ReLU'(a) \rangle_1^B$.
1: $P_0$ & $P_1$ invoke an instance of $\mathcal{F}_{MILL}^n$ with $\eta = \lceil \log n \rceil$, where $P_0$'s input is $(n-1-\langle a \rangle_0^n)$ and $P_1$'s input is$\langle a \rangle_1^n$. For $b \in \{0, 1\}$, $P_b$ learns$\langle$ wrap$\rangle_b^B$ as output.
2: $P_0$ & $P_1$ invoke an instance of $\mathcal{F}_{MILL}^{n+1}$, where $P_0$'s input is $(n-1-\langle a \rangle_0^n)$ and $P_1$'s input is $((n-1)/2 + \langle a \rangle_1^n)$. For $b \in \{0, 1\}$, $P_b$ learns$\langle$ lt$\rangle_b^B$ as output.
3: $P_0$ & $P_1$ invoke an instance of $\mathcal{F}_{MILL}^{n+1}$, where $P_0$'s input is $(n+(n-1)/2-\langle a \rangle_0^n)$ and $P_1$'s input is$\langle a \rangle_1^n$. For $b \in \{0, 1\}$, $P_b$ learns$\langle$ rt$\rangle_b^B$ as output.
4: For $b \in \{0, 1\}$, $P_b$ invokes $\mathcal{F}_{MUX}^2$ with input $(\langle$ lt$\rangle_b^B \oplus \langle$ rt$\rangle_b^B)$ and choice$\langle$ wrap$\rangle_b^B$ to learn $\langle z \rangle_b^B$.
5: For $b \in \{0,1\}$, $P_b$ outputs$\langle z \rangle_b^B \oplus \langle$ lt$\rangle_b^B \oplus$ b.

Optimizations We describe an optimized protocol for $\mathcal{F}_{DReLU}^{ring,n}$ in Algorithm 4 that reduces the number of calls to $\mathcal{F}_{MILL}$ to 2. First, we observe that if the input of $P_1$ is identical in all three invocations, then the invocation of OT in Algorithm 1 (steps 9&10) can be done together for the three comparisons. This reduces the communication for each leaf OT invocation in steps 9&10 by an additive factor of $4\lambda$. To enable this, $P_0$, $P_1$ add $(n-1)/2$ to their inputs to $\mathcal{F}_{MILL}^{\eta+1}$ in steps 1, 3 ($\eta = \lceil \log n \rceil$). Hence, $P_1$'s input to $\mathcal{F}_{MILL}^{\eta+1}$ is $(n-1)/2+\langle a\rangle_1^n$ in all invocations and $P_0$'s inputs are $(3(n-1)/2-\langle n\rangle_0^n)$ $(n-1-\langle a\rangle_0^n)$, $(2n-1-\langle a\rangle_0^n)$ in steps 1, 2, 3, respectively.

---

Algorithm 4 Optimized Integer ring ReLU', $\Pi_{DReLU}^{ring,n}$:

---

Input: $P_0$, $P_1$ hold $\langle a\rangle_0^n$ and $\langle a\rangle_1^n$, respectively, where $a \in \mathbb{Z}_n$. Let $\eta = \lceil \log n \rceil$.
Output: $P_0$, $P_1$ get $\langle ReLU'(a)\rangle_0^B$ and $\langle ReLU'(a)\rangle_1^B$.

1: $P_0$ & $P_1$ invoke an instance of $\mathcal{F}_{MILL}^{\eta+1}$, where $P_0$'s input is $(3(n-1)/2 - \langle a\rangle_0^n)$ and $P_1$'s input is $(n-1)/2 + \langle a\rangle_1^n$. For $b \in \{0, 1\}$, $P_b$ learns $\langle wrap\rangle_b^B$ as output.

2: $P_0$ sets $x = (2n - 1 - \langle a\rangle_0^n)$ if $\langle a\rangle_0^n > (n-1)/2$, else $x = (n - 1 - \langle a\rangle_0^n)$.

3: $P_0$ & $P_1$ invoke an instance of $\mathcal{F}_{MILL}^{\eta+1}$, where $P_0$'s input is $x$ and $P_1$'s input is $((n-1)/2 + \langle a\rangle_1^n)$. For $b \in \{0, 1\}$, $P_b$ learns $\langle xt\rangle_b^B$ as output.

4: $P_0$ samples $\langle z\rangle_0^B \xleftarrow{\$} \{0, 1\}$.

5: for $j = \{00, 01, 10, 11\}$ do
6:     $P_0$ parses $j$ as $j_0||j_1$ and sets $t_j = 1 \oplus \langle xt\rangle_0^B \oplus j_0$.
7:     if $\langle a\rangle_0^n > (n-1)/2$ then
8:       $P_0$ sets $s_j' = t_j \wedge (\langle wrap\rangle_0^B \oplus j_1)$.
9:     else
10:       $P_0$ sets $s_j' = t_j \oplus ((1 \oplus t_j) \wedge (\langle wrap\rangle_0^B \oplus j_1))$.
11:     end if
12:     $P_0$ sets $s_j = s_j' \oplus \langle z\rangle_0^B$
13: end for 14: $P_0$ & $P_1$ invoke an instance of $\binom{4}{1}-OT_1$ where $P_0$ is the sender with inputs $\{s_j\}_j$ and $P_1$ is the receiver with input $\langle xt\rangle_1^B||\langle wrap\rangle_1^B$. $P_1$ sets its output as $\langle z\rangle_1^B$.

15: For $b \in \{0, 1\}$, $P_b$ outputs $\langle z\rangle_b^B$.

---

Next, we observe that one of the comparisons in step 2 or step 3 is redundant. For instance, if $\langle a\rangle_0^n > (n-1)/2$, then the result of the comparison $lt = \langle a\rangle_0^n + \langle a\rangle_1^n > (n-1)/2$ done in step 2 is always 1. Similarly, if $\langle a\rangle_0^n \leq (n-1)/2$, then the result of the comparison $rt = 1\{\langle a\rangle_0^n + \langle a\rangle_1^n > n+(n-1)/2\}$ done in step 3 is always 0. Moreover, $P_0$ knows based on her input $\langle a\rangle_0^n$ which of the two comparisons is redundant. Hence, in the optimized protocol, $P_0$ and $P_1$ always run the comparison to compute shares of wrap and one of the other two comparisons. Note that the choice of which comparison is omitted by $P_0$ need not be communicated to $P_1$, since $P_1$'s input is same in all invocations of $\mathcal{F}_{MILL}$. Moreover, this omission does not reveal any additional information to $P_1$ by security of $\mathcal{F}_{MILL}$. Finally, $P_0$ and $P_1$ can run a $$\binom{4}{1}-OT_1$$

to learn the shares of ReLU'(a). Here, $P_1$ is the receiver and her choice bits are the shares learnt in the two comparisons. $P_0$ is the sender who sets the 4 OT messages based on her input share, and two shares learnt from the comparison protocol. We elaborate on this in the correctness proof below.

Correctness and Security. First, by correctness of $\mathcal{F}_{MILL}^{\eta+1}$ (step 1), wrap=Reconst$^B$ ($\langle wrap\rangle_0^B$, $\langle wrap\rangle_1^B$)=1$\{\langle a\rangle_0^L+\langle a\rangle_1^L > n-1\}$. Let $j^* = \langle xt\rangle_1^B||\langle wrap\rangle_1^B$. Then $t_{j^*} = 1 \oplus xt$. We will show that $s'_{j^*} = ReLU'(a)$, and hence, by correctness of $$\binom{4}{1}-OT_1,$$

$z = ReconstB (\langle z\rangle_0^B, \langle z\rangle_1^B) = ReLU'(a)$. We have the following two cases.

When $\langle a\rangle_0^L > (n-1)/2$, $lt=1$, and $ReLU'(a) = wrap \wedge (1 \oplus rt)$. Here, by correctness of $\mathcal{F}_{MILL}^{\eta+1}$ (step 3), $xt$=Reconst$^B$ ($\langle xt\rangle_0^B$, $\langle xt\rangle_1^B$)=rt. Hence, $s'_{j^*} = t_{j^*} \wedge (\langle wrap\rangle_0^B \oplus j^*_1) = (1 \oplus rt) \wedge wrap$.

When $\langle a\rangle_0^L \leq (n-1)/2$, $rt=0$, ReLU'(a) is $1 \oplus lt$ if wrap=0, else 1. It can be written as $(1 \oplus lt) \oplus (lt \wedge wrap)$. In this case, by correctness of $\mathcal{F}_{MILL}^{\eta+1}$ (step 3), $xt$=Reconst$^B$ ($\langle x\rangle_0^B$, $\langle xt\rangle_1^B$)=lt. Hence, $s'_{j^*} = t_{j^*} \oplus ((1 \oplus t_{j^*}) \wedge (\langle wrap\rangle_0^B \oplus j^*_1)) = (1 \oplus lt) \oplus (lt \wedge wrap)$. Since $\langle z\rangle_0^B$ is uniform, security follows in the $$\left(\mathcal{F}_{MILL}^{\eta+1}, \binom{4}{1} - OT_1\right) - \text{hybrid}.$$

Communication complexity. With the above optimization, the overall communication complexities of our protocol for ReLU' in $\mathbb{Z}_n$ is equivalent to 2 calls to $\Pi_{MILL}^{\eta+1}$ where $P_1$ has same input plus $2\lambda+4$ (for protocol for $$\binom{4}{1}-OT_1).$$

Two calls to $\Pi_{MILL}^{\eta+1}$ in this case (using m=4) cost $<3/2\lambda(\eta+1)+28(\eta+1)$ bits. Hence, total communication is $<3/2\lambda(\eta+1)+28(\eta+1)+2\lambda+4$. We note that the communication complexity of simplified protocol in Algorithm 3 is approximately 3 independent calls to $\Pi_{MILL}^{\eta}$, which cost $3(\lambda\eta+14\eta)$ bits, plus $2\lambda+4$ bits for $\mathcal{F}_{MUX}^2$. Thus, our optimization gives almost 2× improvement.

4 Division and Truncation

We present our results on secure implementations of division in the ring by a positive integer and truncation (division by power-of-2) that are bitwise equivalent to the corresponding cleartext computation. We begin with closed form expressions for each of these followed by secure protocols that use them.

4.1 Expressing General Division and Truncation Using Arithmetic Over Secret Shares Let idiv: $\mathbb{Z} \times \mathbb{Z} \to \mathbb{Z}$ denote signed integer division, where the quotient is rounded towards $-\infty$ and the sign of the remainder is the same as that of divisor. We denote division of a ring element by a positive integer using rdiv: $\mathbb{Z}_n \times \mathbb{Z} \to \mathbb{Z}_n$ defined as $$r\,\mathrm{div}(a,d) \triangleq i\,\mathrm{div}(a_u - 1\{a_u \geq \lceil n/2 \rceil\} \cdot n, d) \bmod n,$$

where the integer $a_u \in \{0, 1, \ldots, n-1\}$ is the unsigned representation of $a \in \mathbb{Z}_n$ lifted to integers and $0 < d < n$. For brevity, we use $x =_n y$ to denote $x \bmod n = y \bmod n$.

THEOREM 4.1. (Division of ring element by positive integer). Let the shares of $a \in \mathbb{Z}n$ be $\langle a \rangle_0^n$, $\langle a \rangle_1^n \in \mathbb{Z}_n$, for some $n = n^1 \cdot d + n^0 \in \mathbb{Z}$, where $n^0$, $n^1$, $d \in \mathbb{Z}$ and $0 \leq n^0 < d < n$. Let the unsigned representation of $a$, $\langle a \rangle_0^n$, $\langle a \rangle_1^n$ in $\mathbb{Z}_n$ lifted to integers be $a_u$, $a_0$, $a_1 \in \{0, 1, \ldots, n-1\}$, respectively, such that $a_0 = a_0^1 \cdot d + a_0^0$ and $a_1 = a_1^1 \cdot d + a_1^0$, where $a_0^1, a_0^0, a_1^1, a_1^0 \in \mathbb{Z}$ and $0 \leq a_0^0, a_1^0 < d$. Let $n' = \lceil n/2 \rceil \in \mathbb{Z}$. Define corr, A, B, C $\in \mathbb{Z}$ as follows:

$$\mathrm{corr} = \begin{cases} -1 & (a_u \geq n') \wedge (a_0 < n') \wedge (a_1 < n') \\ 1 & a_u < n' \wedge a_0 \geq n' \wedge a_1 \geq n' \\ 0 & \text{otherwise} \end{cases}$$

$$A = a_0^0 + a_1^0 - (1\{a_0 \geq n'\} + 1\{a_1 \geq n'\} - \mathrm{corr}) \cdot n^0.$$

$$B = idiv(a_0^0 - 1\{a_0 \geq n'\} \cdot n^0, d) + idiv(a_1^0 - 1\{a_1 \geq n'\} \cdot n^0, d)$$

$$C = 1\{A < d\} + 1\{A < 0\} + 1\{A < -d\}$$

Then, we have:

$$r\,\mathrm{div}(\langle a \rangle_0^n, d) + r\,\mathrm{div}(\langle a \rangle_1^n, d) + (\mathrm{corr} \cdot n^1 + 1 - C - B) \bmod n =_n r\,\mathrm{div}(a, d).$$

The proof of the above theorem is presented in Appendix C.

4.1.1 Special Case of truncation for $\ell$ bit integers.

The expression above can be simplified for the special case of division by $2^s$ of $\ell$-bit integers, i.e., arithmetic right shift with s (>>s), as follows:

COROLLARY 4.2. (Truncation for $\ell$-bit integers). Let the shares of $a \in \mathbb{Z}_L$ be $\langle a \rangle_0^L$, $\langle a \rangle_1^L \in \mathbb{Z}_L$. Let the unsigned representation of $a$, $\langle a \rangle_0^L$, $\langle a \rangle_1^L$ in $\mathbb{Z}_L$ lifted to integers be $a_u$, $a_0$, $a_1 \in \{0, 1, \ldots, 2^\ell - 1\}$, respectively, such that $a_0 = a_0^1 \cdot 2^s + a_0^0$ and $a_1 = a_1^1 \cdot 2^s + a_1^0$, where $a_0^1, a_0^0, a_1^1, a_1^0 \in \mathbb{Z}$ and $0 \leq a_0^0, a_1^0 < 2^s$. Let corr $\in \mathbb{Z}$ be defined as in Theorem 4.1. Then, we have:

$$(a_0 >> s) + (a_1 >> s) + \mathrm{corr} \cdot 2^{\ell-s} + 1\{a_0^0 + a_1^0 \geq 2^s\} =_L (a >> s).$$

PROOF. The corollary follows directly from Theorem 4.1 as follows: First, $(a >> s) = r\mathrm{div}(a, 2^s)$. Next, $n = 2^\ell$, $n^1 = 2^{\ell-s}$, and $n^0 = 0$. Using these, we get $A = a_0^0 + a_1^0$, $B = 0$ and $C = 1\{A < 2^s\} = 1\{a_0^0 + a_1^0 < 2^s\}$.

4.2 Protocols for Division

In this section, we describe our protocols for division in different settings. We first describe a protocol for the simplest case of truncation for $\ell$-bit integers followed by a protocol for general division in $\mathbb{Z}_n$ by a positive integer (Section 4.2.2). Finally, we discuss another simpler case of truncation, which allows us to do better than general division for rings with a special structure (Section 4.2.3).

---

Algorithm 5 Truncation, $\Pi_{Trunc}^{int,\ell,s}$:

---

Input: For $b \in \{0, 1\}$, $P_b$ holds $\langle a \rangle_b^L$, where $a \in \mathbb{Z}_L$.
Output: For $b \in \{0, 1\}$, $P_b$ learns $\langle z \rangle_b^L$ s.t. $z = a >> s$.
  1: For $b \in \{0, 1\}$, let $a_b$, $a_b^1 \in \mathbb{Z}$ be as defined in Corollary 4.2.
  2: For $b \in \{0, 1\}$, $P_b$ invokes $\mathcal{F}_{DReLU}^{int,\ell}$ with input $\langle a \rangle_b^L$ to learn output $\langle \alpha \rangle_b^B$. Party $P_b$ sets
    $\langle m \rangle_b^B = \langle \alpha \rangle_b^B \oplus b$.
  3: For $b \in \{0, 1\}$, $P_b$ sets $x_b = \mathrm{MSB}(\langle a \rangle_b^L)$.
  4: $P_0$ samples $\langle \mathrm{corr} \rangle_0^L \xleftarrow{\$} \mathbb{Z}_2^\ell$.
  5: for $j = \{00, 01, 10, 11\}$ do
  6:    $P_0$ computes $t_j = (\langle m \rangle_0^B \oplus j_0 \oplus x_0) \wedge (\langle m \rangle_0^B \oplus j_0 \oplus j_1)$ s.t. $j = (j_0 || j_1)$.
  7:    if $t_j \wedge 1 \{x_0 = 0\}$ then
  8:       $P_0$ sets $s_j = L - \langle \mathrm{corr} \rangle_0^L - 1$.
  9:    else if $t_j \wedge 1 \{x_0 = 1\}$ then
10:       $P_0$ sets $s_j = L - \langle \mathrm{corr} \rangle_0^L + 1$.
11:    else
12:       $P_0$ sets $s_j = L - \langle \mathrm{corr} \rangle_0^L$.
13:    end if
14: end for
15: $P_0$ & $P_1$ invoke an instance of $\binom{4}{1} - OT\,\ell$, where $P_0$ is the sender with inputs $\{s_j\}_j$ and $P_1$ is the receiver with input $\langle m \rangle_1^B || x_1$ and learns $\langle \mathrm{corr} \rangle_1^L$.

-continued

Algorithm 5 Truncation, $\Pi_{\text{Trunc}}^{\text{int},\ell,s}$:

16: $P_0$ & $P_1$ invoke an instance of $\mathcal{F}_{MILL}^s$ with $P_0$'s input as $2^s-1-a_0^0$ and $P_1$'s input as $a_1^0$.
For $b \in \{0, 1\}$, $P_b$ learns $\langle c \rangle_b^B$.

17: For $b \in \{0, 1\}$, $P_b$ invokes an instance of $\mathcal{F}_{B2A}^L$ (L = $2^\ell$) with input $\langle c \rangle_b^B$ and learns $\langle d \rangle_b^L$.

18: $P_b$ outputs $\langle z \rangle_b^L = (\langle a \rangle_b^L >> s) + \langle \text{corr} \rangle_b^L \cdot 2^{\ell-s} + \langle d \rangle_b^L$, $b \in \{0, 1\}$.

4.2.1 Protocol for truncation of $\ell$-bit integer. Let $\mathcal{F}_{\text{Trunc}}^{\text{int},\ell,s}$ be the functionality that takes arithmetic shares of a as input and returns arithmetic shares of a>>s as output. In this work, we give a protocol Algorithm 5 that realizes the functionality $\mathcal{F}_{\text{Trunc}}^{\text{int},\ell,s}$ correctly building on Corollary 4.2.

Parties $P_0$ & $P_1$ first invoke an instance of $\mathcal{F}_{\text{DReLU}}^{\text{int},\ell}$ (where one party locally flips its share of ReLU'(a)) to get boolean shares $\langle m \rangle_b^B$ of MSB(a). Using these shares, they use a $$\binom{4}{1} - OT_1$$

for calculating $\langle \text{corr} \rangle_b^L$, i.e., arithmetic shares of corr term in Corollary 4.2. Next, they use an instance of $\mathcal{F}_{MILL}^s$ to compute boolean shares of $c=1\{a_0^0+a_1^0\geq 2^s\}$. Finally, they compute arithmetic shares of c using a call to $\mathcal{F}_{B2A}^L$ (Algorithm 7).

Correctness and Security. For any $z \in \mathbb{Z}_L$, MSB(z)=$1\{z_u \geq 2^{\ell-1}\}$, where $z_u$ is unsigned representation of z lifted to integers. First, note that $\text{Reconst}^B(\langle m \rangle_0^B, \langle m \rangle_1^B)=1 \oplus \text{Reconst}^B(\langle a \rangle_0^B, \langle a \rangle_1^B)=\text{MSB}(a)$ by correctness of $\mathcal{F}_{\text{DReLU}}^{\text{int},\ell}$. Next, we show that $\text{Reconst}^L(\langle \text{corr} \rangle_0^L, \langle \text{corr} \rangle_1^L)=\text{corr}$, as defined in Corollary 4.2. Let $x_b=\text{MSB}(\langle a \rangle_b^L)$ for $b \in \{0, 1\}$, and let $j^*=(\langle m \rangle_1^B \| x_1)$. Then, $t_{j^*}=(\langle m \rangle_0^B \oplus \langle m \rangle_1^B \oplus x_0) \wedge (\langle m \rangle_0^B \oplus \langle m \rangle_1^B \oplus x_1)=(\text{MSB}(a) \oplus x_0) \wedge (\text{MSB}(a) \oplus x_1)$. Now, $t_{j^*}=1$ implies that we are in one of the first two cases of expression for corr—which case we are in can be checked using $x_0$ (steps 7 & 9). Now we can see that $s_{j^*}=-\langle \text{corr} \rangle_0^L+\text{corr}=\langle \text{corr} \rangle_1^L$. Next, by correctness of $\mathcal{F}_{MILL}^s$, $c=\text{Reconst}^B \langle c \rangle_0^B, \langle c \rangle_1^B)=1\{a_0^0+a_1^0 \geq 2^s\}$. That is, $c=\langle c \rangle_0^B \oplus \langle c \rangle_1^B$. Given boolean shares of c, step 17, creates arithmetic shares of the same using an instance of $\mathcal{F}_{B2A}^L$. Since $\langle \text{corr} \rangle_0^L$ is uniformly random, security of our protocol is easy to see in $$\left(\mathcal{F}_{\text{DReLU}}^{\text{int},\ell}, \binom{4}{1}-OT_\ell, \mathcal{F}_{MILL}^s, \mathcal{F}_{B2A}^L\right)-\text{hybrid}.$$

Communication complexity. $\Pi_{\text{Trunc}}^{\text{int},\ell,s}$ involves a single call each to $$\mathcal{F}_{\text{DReLU}}^{\text{int},\ell}, \binom{4}{1}-OT_\ell, \mathcal{F}_{B2A}^L \text{ and } \mathcal{F}_{MILL}^s.$$

Hence, communication required is $<\lambda \ell +2\lambda+19\ell$ +communication for $\mathcal{F}_{MILL}^s$ that depends on parameters. For $\ell=32$ and $s=12$, our concrete communication is 4310 bits (using $m=7$ for $\Pi_{MILL}^{12}$ as well as $\Pi_{MILL}^{31}$ inside $\Pi_{\text{DReLU}}^{\text{int},32}$) as opposed to 24064 bits for garbled circuits.

4.2.2 Protocol for division in ring. Let $\mathcal{F}_{Div}^{\text{ring},n,d}$ be the functionality for division that takes arithmetic shares of a as input and returns arithmetic shares of rdiv(a, d) as output. Our protocol builds on our closed form expression from Theorem 4.1. We note that $\ell$-bit integers is a special case of $\mathbb{Z}_n$ and we use the same protocol for division of an element in $\mathbb{Z}_L$ by a positive integer.

This protocol is similar to the previous protocol for truncation and uses the same logic to compute shares of corr term. The most non-trivial term to compute is C that involves three signed comparisons over $\mathbb{Z}$. We emulate these comparisons using calls to $\mathcal{F}_{\text{DReLU}}^{\text{int},\delta}$ where $\delta$ is large enough to ensure that there are no overflows or underflows. We can see that $-2d+2\leq A \leq 2d-2$ and hence, $-3d+2\leq A-d, A, A+d \leq 3d-2$. Hence, we set $\delta=\lceil \log 8d \rceil$. Now, with this value of $\delta$, the term C can we re-written as (ReLU'(A-d)$\oplus$1)+(ReLU'(A)$\oplus$1)+(ReLU'(A+d)$\oplus$1), which can be computed using three calls to $\mathcal{F}_{\text{DReLU}}^{\text{int},\delta}$ (Step 19) and $\mathcal{F}_{B2A}^n$ (Step 20) each. Finally, note that to compute C we need arithmetic shares of A over the ring $\mathbb{Z}_A$, $A=2^\delta$. And this requires shares of corr over the same ring. Hence, we compute shares of corr over both $\mathbb{Z}_n$ and $\mathbb{Z}_A$ (Step 15). Due to space constraints, we describe the protocol formally in Appendix D. Table 3 provides theoretical and concrete communication numbers for division in both $\mathbb{Z}_L$ and $\mathbb{Z}_n$, as well as a comparison with garbled circuits.

4.2.3 Truncation in rings with special structure. Truncation by s in general rings can be done by performing a division by $d=2^s$. However, we can omit a call to $\mathcal{F}_{\text{DReLU}}^{\text{int},\delta}$ and $\mathcal{F}_{B2A}^n$ when the underlying ring and d satisfy a relation. Specifically, if we have $2 \cdot n^0 \leq d=2^s$, then A is always greater than equal to $-d$, where $n^0$, $A \in Z$ are as defined in Theorem 4.1. Thus, the third comparison ($A \leq -d$) in the expression of C from Theorem 4.1 can be omitted. Moreover, this reduces the value of $\delta$ needed and $\delta=\lceil \log 4d \rceil$ suffices since $-2d \leq A-d$, $A \leq 2d-2$.

Our homomorphic encryption scheme requires n to be a prime of the form 2KN+1 (Section 2.2.4), where K is a positive integer and $N \geq 8192$ is a power-of-2. Thus, we have $n^0=n \mod 2^s=1$ for $1 \leq s \leq 14$. For all our benchmarks, $s \leq 12$ and we use this optimization for truncation in $\text{PIE}_{HE}$.

5 Secure Inference

We give an overview of all the layers that are computed securely to realize the task of secure neural network inference. Layers can be broken into two categories—linear and non-linear. An inference algorithm simply consists of a sequence of layers of appropriate dimension connected to each other. Examples of linear layers include matrix multiplication, convolutions, Avgpool and batch normalization, while non-linear layers include ReLU, Maxpool, and Argmax.

We are in the setting of secure inference where the model owner, say $P_0$, holds the weights. When securely realizing each of these layers, we maintain the following invariant: Parties $P_0$ and $P_1$ begin with arithmetic shares of the input to the layer and after the protocol, end with arithmetic shares (over the same ring) of the output of the layer. This allows us to stitch protocols for arbitrary layers sequentially to obtain a secure computation protocol for any neural network comprising of these layers. For protocols in $\text{PIE}_{OT}$, this arithmetic secret sharing is over $\mathbb{Z}_L$; in $\text{PIE}_{HE}$, the sharing is over $\mathbb{Z}_n$, prime n.

5.1 Linear Layers 5.1.1 Fully connected layers and convolutions. A fully connected layer in a neural network is simply a product of two matrices—the matrix of weights and the matrix of activations of that layer—of appropriate dimension. At a very high level, a convolutional layer applies a filter (usually of dimension f×f for small integer f) to the input matrix by sliding across it and computing the sum of elementwise products of the filter with the input. Various parameters are associated with convolutions—e.g. stride (a stride of 1 denotes that the filter slides across the larger input matrix beginning at every row and every column) and zero-padding (which indicates whether the matrix is padded with 0s to increase its dimension before applying the filter). When performing matrix multiplication or convolutions over fixed-point values, the values of the final matrix are scaled down appropriately so that it has the same scale as the inputs to the computation. We note that our values are in fixed-point with an associated scale s and have been encoded into appropriate size rings $\mathbb{Z}_L$ or $\mathbb{Z}_n$ as follows: a Real r is encoded as $[r2^s]$ mod k where k=L or n. Hence, to do faithful fixed-point arithmetic, we first compute the matrix multiplication or convolution over the ring ($\mathbb{Z}_L$ or $\mathbb{Z}_n$) followed by truncation, i.e., division-by-2s of all the values. In $\text{PIE}_{OT}$, multiplication and convolutions over the ring $\mathbb{Z}_L$ are done using oblivious transfer techniques and in $\text{PIE}_{HE}$ these are done over $\mathbb{Z}_n$ using homomorphic encryption techniques that we describe next followed by our truncation method.

OT based computation. We note that OT-based techniques for multiplication are known [8, 24, 50] and we describe them briefly for completeness. First consider the simple case of secure multiplication of 2 elements a and b in $\mathbb{Z}_L$ where $P_0$ knows a and $P_0$ and $P_1$ hold arithmetic shares of b. This can be done with $\ell$ instances of $$\binom{2}{1}-\text{COT}_{\frac{\ell+1}{2}}.$$

Using this, multiplying two matrices $A \in \mathbb{Z}_L^{M,N}$ and $B \in \mathbb{Z}_L^{N,K}$ such that $P_0$ knows A and B is arithmetically secret shared requires MNK $\ell$ instances of $$\binom{2}{1}-\text{COT}_{\frac{\ell+1}{2}}.$$

This can be optimized by using the structured multiplications inside a matrix multiplication by combining all the COT sender messages when multiplying with the same element, reducing the complexity to NK $\ell$ instances of $$\binom{2}{1}-\text{COT}_{\frac{M(\ell+1)}{2}}.$$

Finally, we reduce the task of secure convolutions to secure matrix multiplication similar to [44, 49, 60].

HE based computation. $\text{PIE}_{HE}$, uses techniques from Gazelle [42] and Delphi [48] to compute matrix multiplications and convolutions over a field $\mathbb{Z}_L$ (prime n), of appropriate size. At a high level, first, $P_1$ sends an encryption of its arithmetic share to $P_0$. Then, $P_0$ homomorphically computes on this ciphertext using weights of the model (known to $P_0$) to compute an encryption of the arithmetic share of the result and sends this back to $P_1$. Hence, the communication only depends on the input and output size of the linear layer and is independent of the number of multiplications being performed. Homomorphic operations can have significantly high computational cost—to mitigate this, we build upon the output rotations method from [42] for performing convolutions, and reduce its number of homomorphic rotations. At a very high level, after performing convolutions homomorphically, ciphertexts are grouped, rotated in order to be correctly aligned, and then packed using addition. In our work, we divide the groups further into subgroups that are misaligned by the same offset. Hence the ciphertexts within a subgroup can first be added and the resulting ciphertext can then be aligned using a single rotation as opposed to $\approx c_i/c_n$ in [42] (where $c_i$ denotes the number of input channels and $c_n$ is the number of channels that fit in a single ciphertext). We refer the reader to Appendix E for details.

Faithful truncation. To correctly emulate fixed-point arithmetic, the value encoded in the shares obtained from the above methods are divided-by-2s, where s is the scale used. For this we invoke $\mathcal{F}_{\text{Trunc}}^{\text{int},\ell,s}$ in $\text{PIE}_{OT}$ and $\mathcal{F}_{Div}^{ring,n,2^s}$ in $\text{PIE}_{HE}$ for each value of the resulting matrix. With this, result of secure implementation of fixed-point multiplication and convolutions is bitwise equal to the corresponding cleartext execution. In contrast, many prior works on 2PC [48, 50] and 3PC [44, 49, 60] used a local truncation method for approximate truncation based on a result from [50]. Here, the result can be arbitrarily wrong with a (small) probability p and with probability 1−p the result can be wrong in the last bit. Since p grows with the number of truncations, these probabilistic errors are problematic for large DNNs. Moreover, even if p is small, 1-bit errors can accumulate and the results of cleartext execution and secure execution can diverge; this is undesirable as it breaks correctness of 2PC.

5.1.2 $\text{Avgpool}_d$. The function $\text{Avgpool}_d(a_1, \ldots, a_d)$ over a pool of d elements a1, . . . , ad is defined to be the arithmetic mean of these d values. The protocol to compute this function works as follows: $P_0$ and $P_1$ begin with arithmetic shares (e.g. over $\mathbb{Z}_L$ in $\text{PIE}_{OT}$) of $a_i$, for all $i \in [d]$. They perform local addition to obtain shares of $w=\Sigma_{i=1}^d a_i$ (i.e., $P_b$ computes $\langle w \rangle_b^L = \Sigma_{i=1}^d \langle a_i \rangle_b^L$). Then, parties invoke $\mathcal{F}_{Div}^{ring,L,d}$ on inputs $\langle w \rangle_b^L$ to obtain the desired output. Correctness and security follow in therein $\mathcal{F}_{Div}^{ring,L,d}$-hybrid model. Here too, unlike prior works, our secure execution is bitwise equal to the cleartext version.

5.1.3 Batch Normalization. This layer takes as input vectors c, x, d of the same length, and outputs c⊙x+d, where c⊙x refers to the element-wise product of the vectors c and x. Moreover, c and d are a function of the mean and the variance of the training data set, and some parameters learnt during training. Hence, c and d are known to model owner, i.e., $P_0$. This layer can be computed using techniques of secure multiplication.

5.2 Nonlinear Layers 5.2.1 ReLU. Note that ReLU(a)=a if a≥0, and 0 otherwise. Equivalently, ReLU(a)=ReLU'(a)·a. Once we compute the boolean shares of ReLU'(a) using a call to $\mathcal{F}_{\text{DReLU}}^{\text{int},\ell}$ we compute shares of ReLU(a) using a call to multiplexer functionality $\mathcal{F}_{MUX}^L$ (Section 2.2.3). We describe the protocol for ReLU(a) over $\mathbb{Z}_L$ formally in Algorithm 8, Appendix B (the case of $Z_n$ follows in a similar manner). For communication complexity, refer to Table 2 for comparison with garbled circuits and Appendix B for detailed discussion.

5.2.2 $\text{Maxpool}_d$ and $\text{Argmax}_d$. The function $\text{Maxpool}_d(a_1, \ldots, a_d)$ over d elements $a_1, \ldots, a_d$ is defined in the following way. Define gt(x,y)=z, where w=x−y and z=x, if w>0 and z=y, if w≤0. Define $z_1=a_1$ and $z_i=\text{gt}(a_i, z_{i-1})$, recursively for all 2≤i≤d. Now, $\text{Maxpool}_d(a_1, \ldots, a_d)=z_d$.

We now describe a protocol such that parties begin with arithmetic shares (over $\mathbb{Z}_L$) of $a_i$, for all $i \in [d]$ and end the protocol with arithmetic shares (over $\mathbb{Z}_L$) of Maxpool$_d$ (a$_1$, ..., a$_d$). For simplicity, we describe how P$_0$ and P$_1$ can compute shares of z=gt(x,y) (beginning with the shares of x and y). It is easy to see then how they can compute Maxpool$_d$. First, parties locally compute shares of w=x−y (i.e., P$_b$ computes $\langle w \rangle_b^L = \langle x \rangle_b^L - \langle y \rangle_b^L$, for b∈ {0, 1}). Next, they invoke $\mathcal{F}_{\text{DReLU}}^{\text{int},\ell}$ with input $\langle w \rangle_b^L$ to learn output $\langle v \rangle_b^B$. Now, they invoke $\mathcal{F}_{MUX}^L$ with input $\langle w \rangle_b^L$ and $\langle v \rangle_b^B$ to learn output $\langle t \rangle_b^L$. Finally, parties' output $\langle z \rangle_b^L = \langle y \rangle_b^L + \langle t \rangle_b^L$. The correctness and security of the protocol follows in a straightforward manner. Computing Maxpool d is done using d−1 invocations of the above sub-protocol in d−1 sequential steps.

Argmax$_d$ (a$_1$, ..., a$_d$) is defined similar to Maxpool$_d$ (a$_1$, ..., a$_d$), except that its output is an index i*s.t. a$_{i^*}$=Maxpool$_d$ (a$_1$, ..., a$_d$). Argmax$_d$ can be computed securely similar to Maxpool$_d$ (a$_1$, ..., a$_d$).

6 Implementation

We implement our cryptographic protocols in a library PIE and integrate them into the CrypTFlow framework [1, 44] as a new cryptographic backend. CrypTFlow compiles high-level Tensor-Flow [3] inference code to secure computation protocols, that are then executed by its cryptographic backends. We modify the truncation behavior of CrypTFlow's float-to-fixed compiler, Athos, in support of faithful fixed-point arithmetic. We start by describing the implementation of our cryptographic library, followed by the modifications that we made to Athos.

6.1 Cryptographic Backend

To implement our protocols, we build upon the $$\binom{2}{1} - \text{COT}_\ell$$

implementation from EMP [61] and extend it to $$\binom{k}{1} - \text{COT}_\ell$$

using the protocol from [43]. Our linear-layer implementation using PIE$_{HE}$ is based on SEAL/Delphi [2, 57] and PIE$_{OT}$ is based on EMP. All our protocol implementations are multi-threaded.

Oblivious Transfer.

$$\binom{k}{1} - \text{COT}_\ell$$

uses AES$_{256}^{IC}$ as a hash function in the random oracle model to mask the sender's messages in the OT extension protocol of [43] (There are two types of AES in MPC applications—fixed key (FK) and ideal cipher (IC) [10, 34]. While the former runs key schedule only once and is more efficient, the latter generates a new key schedule for every invocation and is required in this application. It is parameterized by the key size, which is 256 in this case). We incorporated the optimizations from [32, 33] for AES key expansion and pipelining these AES$_{256}^{IC}$ calls. This leads to roughly 6× improvement in the performance of AES$_{256}^{IC}$ calls, considerably improving the overall execution time of $$\binom{k}{1} - \text{COT}_\ell$$

(e.g. 2.7× over LAN for $$\binom{16}{1} - \text{COT}_8.$$

Millionaires' protocol. Recall that m is a parameter in our protocol $\Pi_{\text{MILL}}^{\ell,m}$. While we discussed the dependence of communication complexity on m in Section 3.1.2, here we discuss its influence on the computational cost. Our protocol makes calls to $$\binom{M}{1} - OT_2$$

(after merging steps 9&10), where M=2$^m$. Using OT extension techniques, generating an instance of $$\binom{M}{1} - OT_2$$

requires 6 AES$_{256}^{IC}$ and (M+1) AES$_{256}^{IC}$ evaluations. Thus, the computational cost grows super-polynomial with m. We note that for $\ell$=32, even though communication is minimized for m=7, empirically we observe that m=4 gives us the best performance under both LAN and WAN settings (communication in this case is about 30% more than when m=7 but computation is 3× lower).

Implementing linear layers in PIE$_{HE}$. To implement the linear layers in PIE$_{HE}$, we build upon the Delphi implementation [2, 48], that is in turn based on the SEAL library [57]. We implement the fully connected layers as in [48]. For convolution layers, we parallelize the code, employ modulus-switching [57] to reduce the ciphertext modulus (and hence ciphertext size), and implement the strided convolutions proposed in Gazelle [42] These optimizations resulted in significant performance improvement of convolution layers. E.g. for the first convolution layer of ResNet50, the runtime decreased from 306s to 18s in the LAN setting and communication decreased from 204 MiB to 76 MiB (Layer parameters: image size 230×230, filter size 7×7, input channels 3, output channels 64, and stride size 2×2).

6.2 CrypTFlow Integration

We integrate our protocols into the CrypTFlow framework [1, 44] as a new cryptographic backend. CrypTFlow's float-to-fixed compiler, Athos, outputs fixed-point DNNs that use 64-bit integers and sets an optimal scale using a validation set. CrypTFlow required 64-bits to ensure that the probability of local truncation errors in its protocols is small (Section 5.1.1). Since our protocols are correct and have no such errors, we extend Athos to set both the bitwidth and the scale optimally using the validation set. The bitwidth and scale leak information about the weights and this leakage is similar to the prior works on secure inference [42, 44, 47-50, 60].

Implementing faithful truncations using $\Pi_{\text{Trunc}}^{\text{int},\ell,s}$ requires the parties to communicate. We implement the following peephole optimizations in Athos to reduce the cost of these truncation calls. Consider a DNN having a convolution layer followed by a ReLU layer. While truncation can be done immediately after the convolution, moving the truncation call to after the ReLU layer can reduce the cost of our protocol $\Pi_{\text{Trunc}}^{\text{int},\ell,s}$. Since the values after ReLU are guaranteed to be all positive, the call to $\mathcal{F}_{\text{DReLU}}^{\text{int},\ell}$ within it (step 2 in Algorithm 5) now becomes redundant and can be omitted. Our optimization further accounts for operations that may occur between the convolutions and ReLU, say a matrix addition. Moving the truncation call from immediately after convolution to after ReLU means the activations flowing into the addition operation are now scaled by 2s, instead of the usual s. For the addition operation to then work correctly, we scale the other argument of addition by s as well. These optimizations are fully automatic and need no manual intervention.

7 Experiments

We empirically validate the following claims:
In Section 7.1, we show that our protocols for computing ReLU activations are more efficient than state-of-the-art garbled circuits-based implementations (Table 4). Additionally, our division protocols outperforms garbled circuits when computing average pool layers (Table 7).
On the DNNs considered by prior work on secure inference, our protocols can evaluate the non-linear layers much more efficiently (Section 7.2).
We show the first empirical evaluation of 2-party secure inference on ImageNet-scale benchmarks (Section 7.3). These results show the tradeoffs between OT and HE-based secure DNN inference (Table 6).
We start with a description of our experimental setup and benchmarks, followed by the results.

Experimental Setup. We ran our benchmarks in two network settings, namely, a LAN setting with both machines situated in West Europe, and transatlantic WAN setting with one of the machines in East US. The bandwidth between the machines is 377 MBps and 40 MBps in the LAN and the WAN setting respectively and the echo latency is 0.3 ms and 80 ms respectively. Each machine has commodity class hardware: 3.7 GHz Intel Xeon processor with 4 cores and 16 GBs of RAM.

Our Benchmarks. We evaluate on the ImageNet-scale benchmarks considered by [44]: SqueezeNet [39], ResNet50 [36], and DenseNet121 [37]. To match the reported accuracies, we need 37-bit fixed-point numbers for ResNet50, whereas 32 bits suffice for DenseNet121 and SqueezeNet. Recall that our division protocols lead to correct secure executions and there is no accuracy loss in going from cleartext inference to secure inference. A brief summary of the complexity of these benchmarks is given in Appendix F.

7.1 Comparison with Garbled Circuits

Figure 4:
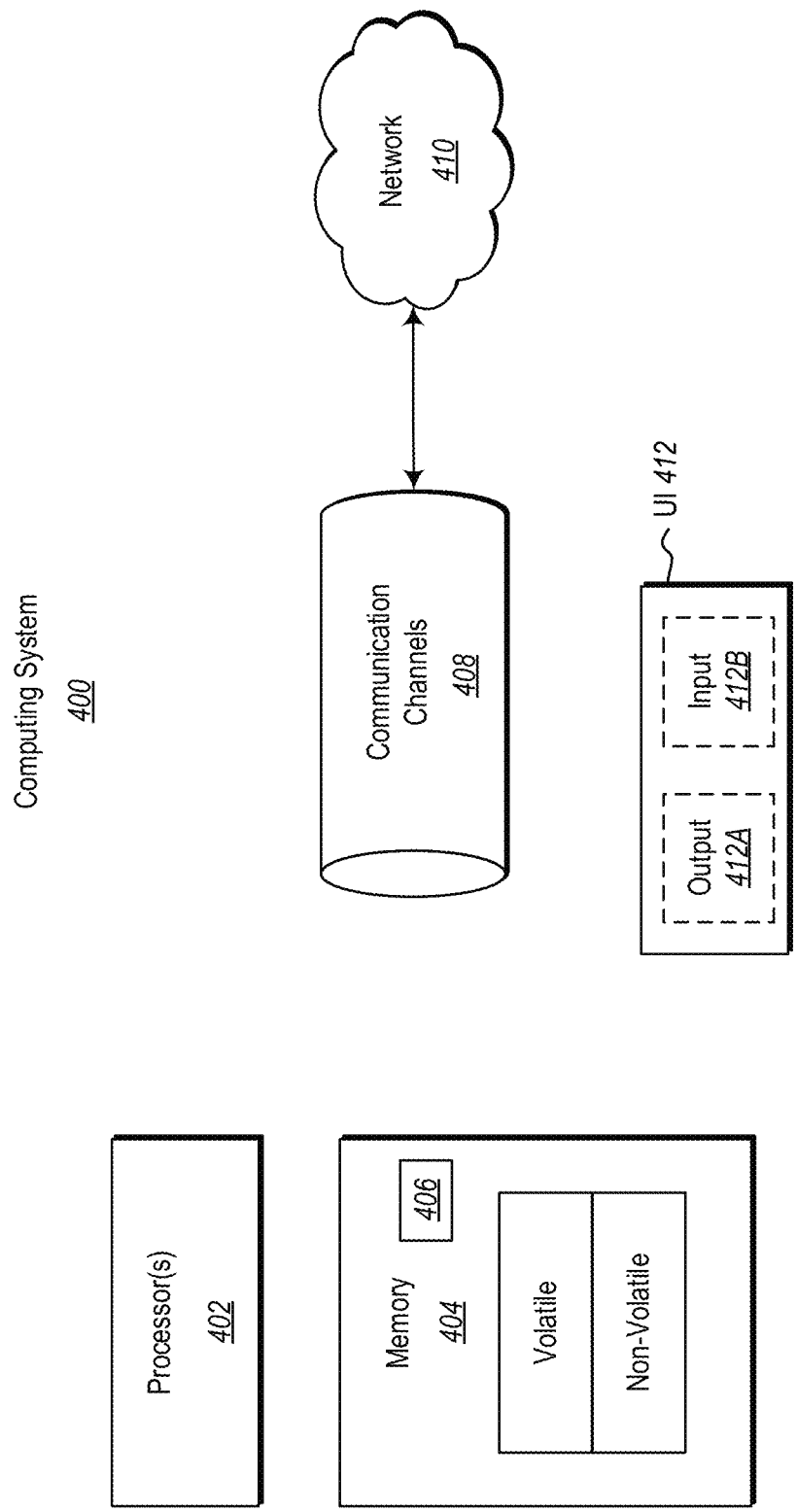
FIG. 4 illustrates an example computing system that may represent an example of the first party computing system and the second party computing system of FIG. 1.

We compare with EMP-toolkit [61], the state-of-the-art library for Garbled Circuits (GC). FIG. 4 shows the improvement of our ReLU protocols over GC in both LAN and WAN settings.

On the x-axis, which is in log-scale, the number of ReLUs range from $2^0$ to $2^{20}$. The histogram shows, using the right y-axis, the cumulative number of layers in our benchmarks (SqueezeNet, ResNet50, DenseNet121) which require the number of ReLU activations given on the x-axis. We observe that these DNNs have layers that compute between $2^{13}$ and $2^{20}$ ReLUs. For such layers, we observe (on the left y-axis) that our protocols are 2×-25× faster than GC—the larger the layers the higher the speedups, and gains are larger in the WAN settings. Specifically, for WAN and >$2^{17}$ ReLUs, the speedups are much higher than the LAN setting. Here, the cost of rounds is amortized over large layers and the communication cost is a large fraction of the total runtime. Note that our implementations perform load-balancing to leverage full-duplex TCP.

Next, we compare the time taken by GC and our protocols in computing the ReLU activations of our benchmarks in Table 4.

TABLE 4

Performance comparison of Garbled Circuits with our protocols for computing ReLU layers. Runtimes are in seconds and communication numbers are in GiB.

| Benchmark | Garbled Circuits | | | Our Protocols | | |
|---|---|---|---|---|---|---|
| | LAN | WAN | Comm | LAN | WAN | Comm |
| (a) over $\mathbb{Z}_{2^\ell}$ | | | | | | |
| SqueezeNet | 26.4 | 265.6 | 7.63 | 3.5 | 33.3 | 1.15 |
| ResNet50 | 136.5 | 1285.2 | 39.19 | 16.4 | 69.4 | 5.23 |
| DenseNet121 | 199.6 | 1849.3 | 56.57 | 24.8 | 118.7 | 8.21 |
| (b) over $\mathbb{Z}_n$ | | | | | | |
| SqueezeNet | 51.7 | 525.8 | 16.06 | 5.6 | 50.4 | 1.77 |
| ResNet50 | 267.5 | 2589.7 | 84.02 | 28.0 | 124.0 | 8.55 |
| DenseNet121 | 383.5 | 3686.2 | 118.98 | 41.9 | 256.0 | 12.64 |

Our protocol over $\mathbb{Z}_L$ is up to 8× and 18× faster than GC in the LAN and WAN settings respectively, while it is ≈7× more communication efficient. As expected, our protocol over $\mathbb{Z}_n$ has even better gains over GC. Specifically, it is up to 9× and 21× faster in the LAN and WAN settings respectively, and has 9× less communication.

We also performed a similar comparison of our protocols with GC for the Avgpool layers of our benchmarks, and saw up to 51× reduction in runtime and 41× reduction in communication. We report the concrete performance numbers and discuss the results in more detail in Appendix G.

7.2 Comparison with State-of-the-Art

In this section, we compare with Gazelle [42] and Delphi [48], which are the current state-of-the-art for 2-party secure DNN inference that outperform [13, 14, 18, 20, 23, 30, 47, 55]. They use garbled circuits for implementing their non-linear layers, and we show that with our protocols, the time taken to evaluate the non-linear layers of their benchmarks can be decreased significantly.

For a fair evaluation, we demonstrate these improvements on the benchmarks of Delphi [48], i.e., the MiniONN (CIFAR-10) [47] and ResNet32 (CIFAR-100) DNNs (as opposed to the ImageNet-scale benchmarks for which their systems have not been optimized). For these benchmarks, Gazelle and Delphi have the same total time and communication; we refer to them as GD. Since Gazelle's choice of parameters was insecure, which was later fixed in Delphi, we use Delphi's implementation for comparing with them.)

In Table 5, we report the performance of GD for evaluating the linear and non linear components of MiniONN and ResNet32 separately, along with the performance of our protocols for the same non-linear computation (Our non-linear time includes the cost of truncation).

TABLE 5

Performance comparison of our protocols for non-linear layers with Gazelle/Delphi (GD). Runtimes are in seconds and communication numbers are in GiB.

| Benchmark | Computation | LAN | WAN | Comm |
|---|---|---|---|---|
| MiniONN | GD linear | 10.7 | 11.4 | 0.02 |
| | GD Non-Linear | 30.2 | 124.0 | 3.15 |
| | Our Non-Linear | 1.0 | 14.5 | 0.28 |

TABLE 5-continued

Performance comparison of our protocols for non-linear layers with Gazelle/Delphi (GD). Runtimes are in seconds and communication numbers are in GiB.

| Benchmark | Computation | LAN | WAN | Comm |
|---|---|---|---|---|
| ResNet32 | GD Linear | 15.9 | 22.7 | 0.07 |
| | GD Non-Linear | 52.9 | 211.3 | 5.51 |
| | Our Non-Linear | 2.4 | 45.3 | 0.59 |

The table shows that the time to evaluate non-linear layers is the bulk of the total time and our protocols are 4×-30× faster in evaluating the non-linear layers. Also note that we reduce the communication by 11× on MiniONN, and require around 9× less communication on ResNet32.

7.3 Evaluation on Practical DNNs

With all our protocols and implementation optimizations in place, we demonstrate the scalability of PIE by efficiently running ImageNet-scale secure inference. Table 6 shows that both our backends, $PIE_{OT}$ and $PIE_{HE}$, are efficient enough to evaluate SqueezeNet in under a minute and scale to ResNet50 and DenseNet121.

TABLE 6

Performance of PIE on ImageNet-scale benchmarks. Runtimes are in seconds and communication in GiB.

| Benchmark | Protocol | LAN | WAN | Comm |
|---|---|---|---|---|
| SqueezeNet | $PIE_{OT}$ | 44.3 | 293.6 | 26.07 |
| | $PIE_{HE}$ | 59.2 | 156.6 | 5.27 |
| ResNet50 | $PIE_{OT}$ | 619.4 | 3611.6 | 370.84 |
| | $PIE_{HE}$ | 545.8 | 936.0 | 32.43 |
| DenseNet121 | $PIE_{OT}$ | 371.4 | 2257.7 | 217.19 |
| | $PIE_{HE}$ | 463.2 | 1124.7 | 35.56 |

In the LAN setting, for both SqueezeNet and DenseNet121, $PIE_{OT}$ performs better than $PIE_{HE}$ by at least 20% owing to the higher compute in the latter. However, the quadratic growth of communication with bitlength in the linear-layers of $PIE_{OT}$ can easily drown this difference if we go to higher bitlengths. Because ResNet50, requires 37-bits (compared to 32 in SqueezeNet and DenseNet121) to preserve accuracy, $PIE_{HE}$ outperforms $PIE_{OT}$ in both LAN and WAN settings. In general for WAN settings where communication becomes the major performance bottleneck, $PIE_{HE}$ performs better than $PIE_{OT}$: 2× for SqueezeNet and DenseNet121 and 4× for ResNet50. Overall, with PIE, we could evaluate all the 3 benchmarks within 10 minutes on LAN and 20 minutes on WAN. Since PIE supports both $PIE_{OT}$ and $PIE_{HE}$, one can choose a specific backend depending on the network statistics [18, 52] to get the best secure inference latency. To the best of our knowledge, no prior system provides this support for OT and HE-based secure DNN inference.

8 Conclusion

We have presented secure, efficient, and correct implementations of practical 2-party DNN inference that outperform prior work in both latency and scale. Like all prior work on 2PC for secure DNN inference, PIE only considers semi-honest adversaries.

9. Computing System

Because the principles described herein are performed in the context of a computing system, some introductory discussion of a computing system will be described with respect to FIG. 4. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 4, in its most basic configuration, a computing system 400 includes at least one hardware processing unit 402 and memory 404. The processing unit 402 includes a general-purpose processor. Although not required, the processing unit 402 may also include a field programmable gate array (FPGA), an application specific integrated circuit (ASIC), or any other specialized circuit. In one embodiment, the memory 404 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 400 also has thereon multiple structures often referred to as an "executable component". For instance, the memory 404 of the computing system 400 is illustrated as including executable component 406. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 404 of the computing system 400. Computing system 400 may also contain communication channels 408 that allow the computing system 400 to communicate with other computing systems over, for example, network 410.

While not all computing systems require a user interface, in some embodiments, the computing system 400 includes a user interface system 412 for use in interfacing with a user. The user interface system 412 may include output mechanisms 412A as well as input mechanisms 412B. The principles described herein are not limited to the precise output mechanisms 412A or input mechanisms 412B as such will depend on the nature of the device. However, output mechanisms 412A might include, for instance, speakers, displays, tactile output, virtual or augmented reality, holograms and so forth. Examples of input mechanisms 412B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

10. Appendix

A. Supporting Protocols

Here, we describe supporting protocols that our main protocols rely on.

A.1 Protocol for Regular $\mathcal{F}_{and}$

Regular $\mathcal{F}_{AND}$ can be realized using bit-triples [8], which are of the form $(\langle d \rangle_b^B, \langle e \rangle_b^B, \langle f \rangle_b^B)$, where $b \in \{0, 1\}$ and $d \wedge e = f$. Using an instance of $$\binom{16}{1} - OT_2,$$

the parties can generate two bit-triples. We describe this protocol for generating the first triple, and from there, it will be easy to see how to also generate the second one. The parties start by sampling random shares $$\langle d \rangle_b^B, \langle e \rangle_b^B \xleftarrow{\$} \{0, 1\} \text{ for } b \in \{0, 1\}.$$

$P_1$ sets the first two bits of its input to $$\binom{16}{1} - OT_2,$$

as $\langle d \rangle_1^B \| \langle e \rangle_1^B$, while the other two bits are used for the second triple. $P_0$ samples a random bit r and sets its input messages to $$\binom{16}{1} - OT_2$$

as follows: for the i-th message, where $i \in \{0, 1\}^4$, $P_0$ uses the first two bits $i_1 \| i_2$ of i to compute $r \oplus ((i_1 \oplus \langle d \rangle_0^B \wedge (i_2 \oplus \langle e \rangle_0^B))$, and sets it as the first bit of the message, while reserving the second bit for the other triple. Finally, $P_0$ sets $\langle f \rangle_0^B = r$, and $P_1$ sets the first bit of the output of $$\binom{16}{1} - OT_2 \text{ as } \langle f \rangle_1^B.$$

Correctness can be seen by noting that $\langle f \rangle_1^B = \langle f \rangle_0^B \oplus (d \wedge e)$, and since $\langle f \rangle_0^B$ is uniformly random, security follows directly in the $$\binom{16}{1} - OT_2 - \text{hybrid}.$$

The communication of this protocol is the same as that of $$\binom{16}{1} - OT_2,$$

which is $2\lambda + 16 \cdot 2$ bits. Since we generate two bit-triples using this protocol, the amortized cost per triple is $\lambda + 16$ bits, which is 144 for $\lambda = 128$.

A.2 Protocol for Correlated $\mathcal{F}_{AND}$

Correlated triples are two sets of bit triples ($(\langle d \rangle_b^B, \langle e \rangle_b^B, \langle f \rangle_b^B)$ and ($(\langle d' \rangle_b^B), \langle e' \rangle_b^B, \langle f' \rangle_b^B$), for $b \in \{0, 1\}$, such that $e = e'$, $d \wedge e = f$, and $d' \wedge e' = f'$. The protocol from Appendix A.1 used a $$\binom{16}{1} - OT_2$$

invocation to generate two regular triples, where the 4 bits of $P_1$'s input were its shares of d, e, d', and e'. However, when generating correlated triples, we can instead use an instance of $$\binom{8}{1} - OT_2$$

because $e = e'$, and thus, 3 bits suffice to represent $P_1$'s input. Correctness and security follow in a similar way as in the case of regular $\mathcal{F}_{AND}$ (see Appendix A.1).

The communication of this protocol is equal to that of $$\binom{8}{1} - OT_2,$$

which costs $2\lambda + 8 \cdot 2$ bits. Thus, we get an amortized communication of $\lambda + 8$ bits per correlated triple.

A.3 Protocol for Multiplexer

We describe our protocol for realizing $\mathcal{F}_{MUX}^2$ in Algorithm 6. First we argue correctness. Let $c = \text{Reconst}^B(\langle c \rangle_0^B, \langle c \rangle_1^B) = \langle c \rangle_0^B \oplus \langle c \rangle_1^B$. By correctness of $$\binom{2}{1} - OT_\eta,$$

$x_1 = -r_0 + c \cdot \langle a \rangle_0^\eta$. Similarly, $x_0 = -r_1 + c \cdot \langle a \rangle_1^\eta$. Hence, $\text{Reconst}^\eta(\langle z \rangle_0^\eta, \langle a \rangle_1^\eta) = z_0 + z_1 = c \cdot a$. Security trivially follows in $$\binom{2}{1} - OT_\eta - \text{hybrid}.$$

Communication complexity is $2(\lambda+\lambda\eta)$.

---

Algorithm 6 Multiplexer, $\Pi_{MUX}{}^n$:

---

Input: For $b \in \{0, 1\}$, $P_b$ holds $\langle a \rangle_b^n$ and $\langle c \rangle_b^B$.
Output: For $b \in \{0, 1\}$, $P_b$ learns $\langle z \rangle_b^n$ s.t. $z = a$ if $c = 1$, else $z = 0$.

1: For $b \in \{0, 1\}$, $P_b$ picks $r_b \xleftarrow{\$} \mathbb{Z}_n$.

2: $P_0$ sets $s_0, s_1$ as follows: If $\langle c \rangle_0^B = 0$, $(s_0, s_1) = (-r_0, -r_0 + \langle a \rangle_0^n )$. Else, $(s_0, s_1) = (-r_0 + \langle a \rangle_0^n, -r_0)$.

3: $P_0$ & $P_1$ invoke an instance of $\binom{2}{1} - OT_\eta$ where $P_0$ is the sender with inputs $(s_0, s_1)$ and $P_1$ is the receiver with input $\langle c \rangle_1^B$. Let $P_1$'s output be $x_1$.

4: $P_1$ sets $t_0, t_1$ as follows: If $\langle c \rangle_1^B = 0$, $(t_0, t_1) = (-r_1, -r_1 + \langle a \rangle_1^n )$. Else, $(t_0, t_1) = (-r_1 + \langle a \rangle_1^n, -r_1)$.

5: $P_0$ & $P_1$ invoke an instance of $\binom{2}{1} - OT_\eta$ where $P_1$ is the sender with inputs $(t_0, t_1)$ and $P_0$ is the receiver with input $\langle c \rangle_0^B$. Let $P_0$'s output be $x_0$.

6: For $b \in \{0, 1\}$, $P_b$ outputs $\langle z \rangle_b^n = r_b + x_b$.

---

A.4 Protocol for B2A

We describe our protocol for realizing $\mathcal{F}_{B2A}{}^n$ formally in Algorithm 7. For correctness, we need to show that $d = \text{Reconst}^L (\langle d \rangle_0^n, \langle d \rangle_1^n) = \langle c \rangle_0^B + \langle c \rangle_1^B - 2\langle c \rangle_0^B \langle c \rangle_1^B$. By correctness of $$\binom{2}{1} - COT_\eta, y1 = x + \langle c \rangle_0^B \langle c \rangle_1^B.$$

Using this, $\langle d \rangle_0^n = \langle c \rangle_0^B + 2x$ and $\langle d \rangle_1^n = \langle c \rangle_1^B - 2x - 2\langle c \rangle_0^B \langle c \rangle_1^B$. Security follows from the security of $$\binom{2}{1} - COT_\eta$$

and communication required is $\lambda + \eta$ bits.

---

Algorithm 7 Boolean to Arithmetic, $\Pi_{B2A}{}^n$:

---

Input: $P_0$, $P_1$ hold $\langle c \rangle_0^B$ and $\langle c \rangle_1^B$, respectively, where $c \in \{0, 1\}$.
Output: $P_0$, $P_1$ learn $\langle d \rangle_0^n$ and $\langle d \rangle_1^n$, respectively, s.t. $d = c$.

1: $P_0$ & $P_1$ invoke an instance of $\binom{2}{1} - COT_\eta$ where $P_0$ is the sender with correlation function $f(x) = x + \langle c \rangle_0^B$ and $P_1$ is the receiver with input $\langle c \rangle_1^B$. Party $P_0$ learns $x$ and sets $y_0 = n - x$ and $P_1$ learns $y_1$.

2: For $b \in \{0, 1\}$, $P_b$ computes $\langle d \rangle_b^n = \langle c \rangle_b^B - 2 \cdot y_b$.

---

B Protocol for ReLU

We describe our ReLU protocol for the case where the input and output shares are over $\mathbb{Z}_L$ in Algorithm 8, and note that the case of $\mathbb{Z}_n$ follows similarly. It is easy to see that the correctness and security of the protocol follow in the $j$ ($\mathcal{F}_{DReLU}^{int,\ell}$, $\mathcal{F}_{MUX}^L$)-hybrid.

Communication complexity. We first look at the complexity of $\Pi_{ReLU}^{int,\ell}$, which involves a call to $\mathcal{F}_{DReLU}^{int,\ell}$, and $\mathcal{F}_{MUX}^L$.

$\mathcal{F}_{DReLU}^{int,\ell}$, has the same communication as $\mathcal{F}_{MILL}^{\ell-1}$, which requires $\lambda(\ell-1) + 13\frac{1}{2}(\ell-1) - 2\lambda - 22$ bits if we assume m=4 and ml($\ell - 1$), and exclude optimization (3.1.1) in the general expression from Section 3.1.2. $\mathcal{F}_{MUX}^L$ incurs a cost of $2\lambda + 4\ell$ bits, bringing the total cost to $\lambda\ell + 17\frac{1}{2}\ell - \lambda - 35\frac{1}{2}$ bits, which can be rewritten as $< \lambda\ell + 18\ell$. We get our best communication for $\ell = 32$ (with all the optimizations) by taking m=7 for the $\Pi_{MILL}^{32}$, invocation inside $\Pi_{DReLU}^{int,32}$, which gives us a total communication of 3298 bits.

Now, we look at the complexity of $\Pi_{ReLU}^{ring,n}$, which makes calls to $\mathcal{F}_{DReLU}^{ring,n}$ and $_{MUX}{}^n$). The cost of $_{DReLU}^{ring,n}$ is $2\lambda + 4$ bits for $$\binom{4}{1} - OT1,$$

plus $(3/2)\lambda(\eta+1) + 27(\eta+1) - 4\lambda - 44$ bits for 2 invocations of $_{MILL}^{n+1}$, where $P_1$'s input is the same in both invocations and the same assumptions are made as for the expression of $\mathcal{F}_{MILL}^{\ell-1}$ above. The cost of $_{MUX}{}^n$ is $2\lambda + 4\eta$ bits, and thus, the total cost is $(3/2)\lambda(\eta+1) + 31\eta - 13$, which can be rewritten as $< (3/2)\lambda(\eta+1) + 31\eta$. Concretely, we get the best communication for $\eta = 32$ by taking m=7 for the millionaire invocations, getting a total communication of 5288 bits.

Algorithm 8 $\ell$-bit integer ReLU, $\Pi_{ReLU}^{int,\ell}$:
Input: $P_0$, $P_1$ hold $\langle a \rangle_0^L$ and $\langle a \rangle_1^L$, respectively.
Output: $P_0$, $P_1$ get $\langle ReLU(a) \rangle_0^L$ and $\langle ReLU(a) \rangle_1^L$.
1: For $b \in \{0, 1\}$, $P_b$ invokes $\mathcal{F}_{DReLU}^{int,\ell}$ with input $\langle a \rangle_b^L$ to learn output $\langle y \rangle_b^B$.
2: For $b \in \{0, 1\}$, $PP_b$ invokes $\mathcal{F}_{MUX}^L$ with inputs $\langle a \rangle_b^L$ and $\langle y \rangle_b^B$ to learn $\langle z \rangle_b^L$ and sets
$\langle ReLU(a) \rangle_b^L = \langle z \rangle_b^L$.

C Proof of Division Theorem

Here, we prove Theorem 4.1.
From Equation 2, we can write $rdiv(\langle a \rangle_i^n, d)$ as:

$$rdiv(\langle a \rangle_i^n, d) =_n idiv(a_i - 1\{a_i \geq n'\} \cdot n, d) \quad (3)$$
$$=_n idiv(a_i^1 \cdot d + a_i^0 - 1\{a_i \geq n'\} \cdot (n^1 \cdot d + n^0), d)$$
$$=_n a_i^1 - 1\{a_i \geq n'\} \cdot n^1 + idiv(a_i^0 - 1\{a_i \geq n'\} \cdot n^0, d),$$

for $i \in \{0, 1\}$. $a_u$ can be expressed as $a_u = a_0 + a_1 - w \cdot n$, where the wrap-bit $w = 1\{a_0 + a_1 \geq n\}$. We can rewrite this as:

$$a_u = a_0 + a_1 - w \cdot n \quad (4)$$
$$= (a_0^1 + a_1^1 - w \cdot n^1) \cdot d + (a_0^0 + a_1^0 - w \cdot n^0)$$
$$= (a_0^1 + a_1^1 - w \cdot n^1 + k) \cdot d + (a_0^0 + a_1^0 - w \cdot n^0 - k \cdot d),$$

for some integer $k$ such that $0 \leq a_0^0 + a_1^0 - w \cdot n^0 - k \cdot d < d$. Similar to Equation 3 and from Equation 4, we can write $rdiv(a, d)$ as:

$$rdiv(a, d) =_n a_0^1 + a_1^1 - w \cdot n^1 + k - 1\{a \geq n'\} \cdot n^1 + \quad (5)$$
$$idiv(a_0^0 + a_1^0 - w \cdot n^0 - k \cdot d - 1\{a \geq n'\} \cdot n^0, d)$$
$$=_n a_0^1 + a_1^1 - w \cdot n^1 - 1\{a \geq n'\} \cdot n^1 +$$
$$idiv(a_0^0 + a_1^0 - w \cdot n^0 - 1\{a \geq n'\} \cdot n^0, d).$$

From Equations 3 and 5, we have the following correction term:

$$c =_n rdiv(a, d) - rdiv(\langle a \rangle_0^n, d) - rdiv(\langle a \rangle_1^n, d) =_n (1\{a_0 \geq n'\} + \quad (6)$$
$$1\{a_1 \geq n'\} - w - 1\{a \geq n'\}) \cdot n^1 +$$
$$idiv(a_0^0 + a_1^0 - w \cdot n^0 - 1\{a \geq n'\} \cdot n^0, d) -$$
$$(idiv(a_0^0 - 1\{a_0 \geq n'\} \cdot n^0, d) + idiv(a_1^0 - 1\{a_1 \geq n'\} \cdot n^0, d)).$$
$$=_n c^1 \cdot n^1 + c^0 - B \quad (7)$$

Let $A'_i = idiv(a_0^0 + a_1^0 - i \cdot n^0, d)$. Then the values of the correction terms $c^1$ and $c^0$ are as summarized in the following table:

| # | $1(a_0 \geq n')$ | $1(a_1 \geq n')$ | $1(a_u \geq n')$ | w | $c^1$ | $c^0$ |
|---|---|---|---|---|---|---|
| 1 | 0 | 0 | 0 | 0 | 0 | $A'_0$ |
| 2 | 0 | 0 | 1 | 0 | −1 | $A'_1$ |
| 3 | 0 | 1 | 0 | 1 | 0 | $A'_1$ |
| 4 | 0 | 1 | 1 | 1 | 0 | $A'_1$ |
| 5 | 1 | 0 | 0 | 1 | 0 | $A'_1$ |
| 6 | 1 | 0 | 1 | 1 | 0 | $A'_1$ |
| 7 | 1 | 1 | 0 | 1 | 1 | $A'_1$ |
| 8 | 1 | 1 | 1 | 1 | 0 | $A'_2$ |

From the table, we have $c^1 = corr$ and can rewrite the correction term as $c =_n corr \cdot n^1 + c^0 - B$. Thus, adding $corr \cdot n^1 - B$ mod n to $rdiv(\langle a \rangle_0^n, d) + rdiv(\langle a \rangle_1^n, d)$ accounts for all the correction terms except $c_0$ mod n.

Now all that remains to be proven is that $c^0 = 1 - C$. Let $C_0 = 1\{A < d\}$, $C_1 = 1\{A < 0\}$, and $C_2 = 1\{A < -d\}$. Then, we have $C = C_0 + C_1 + C_2$. Note from the theorem statement that $A = a_0^0 + a_1^0$ and $A = a_0^0 + a_1^0 - 2 \cdot n^0$ for the cases corresponding to rows 1 and 8 respectively from the table, while $A = a_0^0 + a_1^0 - n^0$ for the rest of cases. Thus, it can be herein seen that $c^0 = idiv(A, d)$. Also note that $-2 \cdot d + 2 \leq A \leq 2 \cdot d - 2$, implying that the range of $c^0$ is $\{-2, -1, 0, 1\}$. Now we look at each value assumed by $c^0$ separately as follows:

$c^0 = -2$: In this case, we have $(A < -d)$, implying $C_0 = C_1 = C_2 = 1$, and $1 - C = -2$.

$c^0 = -1$: In this case, we have $(-d \leq A < 0)$, implying $C_0 = C_1 = 1$, $C_2 = 0$ and $1 - C = -1$.

$c^0 = 0$: In this case, we have $(0 \leq A < d)$, implying $C_0 = 1$, $C_1 = C_2 = 0$ and $1 - C = 0$.

$c^0 = 1$: In this case, we have $(d \leq A)$, implying $C_0 = C_1 = C_2 = 0$ and $1 - C = 1$.

Thus, $c =_n corr \cdot n^1 + (1 - C) - B =_n rdiv(a, d) - rdiv(\langle a \rangle_0^n, d) - rdiv(\langle a \rangle_1^n, d)$.

D Protocol for General Division

We describe our protocol for general division formally in Algorithm 9. As discussed in Section 4.2.2, our protocol builds on Theorem 4.1 and we compute the various subterms securely using our new protocols. Let $\delta = \lceil \log \delta d \rceil$. We compute the shares of corr over both $\mathbb{Z}_n$ and $\mathbb{Z}_\Delta$ (Step 15). We write the term C as $(ReLU'(A-d) \oplus 1) + (ReLU'(A) \oplus 1) + (ReLU'(A+d) \oplus 1)$, which can be computed using three calls to $\mathcal{F}_{DReLU}^{int,\delta}$ (Step 19) and $\mathcal{F}_{B2A}^n$ (Step 20) each.

Algorithm 9 Integer ring division, $\Pi_{DIV}^{ring,n,d}$:

Input: For $b \in \{0, 1\}$, $P_b$ holds $\langle a \rangle_b^n$, where $a \in \mathbb{Z}n$.
Output: For $b \in \{0, 1\}$, $P_b$ learns $\langle z \rangle_b^n$ s.t. $z = rdiv(a, d)$.
1: For $b \in \{0, 1\}$, let $a_b$, $a_b^0$, $a_b^1 \in \mathbb{Z}$ and $n^0$, $n^1$, $n' \in \mathbb{Z}$ be as defined in Theorem 4.1. Let $\eta = \lceil \log(n) \rceil$, $\delta = \lceil \log 6d \rceil$, and $\Delta = 2^\delta$.
2: For $b \in \{0, 1\}$, $P_b$ invokes $\mathcal{F}_{DReLU}^{ring,n}$ with input $\langle a \rangle_b^n$ to learn output $\langle \alpha \rangle_b^B$. Party $P_b$ sets $\langle m \rangle_b^B = \langle \alpha \rangle_b^B \oplus b$.
3: For $b \in \{0, 1\}$, $P_b$ sets $x_b = 1\{\langle \alpha \rangle_b^B \geq n'\}$.

-continued

Algorithm 9 Integer ring division, $\Pi_{DIV}^{ring,n,d}$:

4:  $P_0$ samples $\langle corr \rangle_0^n \xleftarrow{\$} \mathbb{Z}_n$ and $\langle corr \rangle_0^\Delta \xleftarrow{\$} \mathbb{Z}_\Delta$.

5:  for j = {00, 01, 10, 11} do
6:      $P_0$ computes $t_j = (\langle m \rangle_0^B \oplus j_0 \oplus x_0) \wedge (\langle m \rangle_0^B \oplus j_0 \oplus j_1)$ s.t.j = $(j_0||j_1)$.
7:      if $t_j \wedge 1\{x_0 = 0\}$ then
8:          $P_0$ sets $s_j =_n -\langle corr \rangle_0^n - 1$ and $r_j =_\Delta -\langle corr \rangle_0^\Delta - 1$.
9:      else if $t_j \wedge 1\{x_0 = 1\}$ then
10:         $P_0$ sets $s_j =_n -\langle corr \rangle_0^n + 1$ and $r_j =_\Delta -\langle corr \rangle_0^\Delta + 1$.
11:     else
12:         $P_0$ sets $s_j =_n -\langle corr \rangle_0^n$ and $r_j =_\Delta -\langle corr \rangle_0^\Delta$.
13:     end if
14: end for 15: $P_0$ & $P_1$ invoke an instance of $\binom{4}{1} - OT_{\eta+\delta}$ where $P_0$ is the sender with inputs $\{s_j \| r_j\}_j$ and $P_1$ is the receiver with input $\langle m \rangle_1^B \| x_1$. $P_1$ sets its output as $\langle corr \rangle_1^n \| \langle corr \rangle_1^\Delta$.
16: For $b \in \{0, 1\}$, $P_b$ sets $\langle A \rangle_b^\Delta =_\Delta a_b^0 - (x_b - \langle corr \rangle_b^\Delta) \cdot n^0$.
17: For $b \in \{0, 1\}$, $P_b$ sets $\langle A_0 \rangle_b^\Delta =_\Delta \langle A \rangle_b^\Delta - b \cdot d$, $\langle A_1 \rangle_b^\Delta = \langle A \rangle_b^\Delta$, and $\langle A_2 \rangle_b^\Delta =_\Delta \langle A \rangle_b^\Delta + b \cdot d$.
18: for j = {0, 1, 2} do
19:     For $b \in \{0, 1\}$, $P_b$ invokes $\mathcal{F}_{DReLU}^{int,\delta}$ with input $\langle A_j \rangle_b^\Delta$ to learn output $\langle \gamma_j \rangle_b^\Delta$. Party $P_b$ sets$\langle C'j \rangle B_b = \langle \gamma_j \rangle_b^B \oplus b$.
20:     For $b \in \{0, 1\}$, $P_b$ invokes an instance of $\mathcal{F}_{B2A}^n$ with input $\langle C'_j \rangle_b^B$ and learns $\langle C_j \rangle_b^n$.
21: end for
22: For $b \in \{0, 1\}$, $P_b$ sets $\langle C \rangle_b^n = \langle C_0 \rangle_b^n + \langle C_1 \rangle_b^n + \langle C_2 \rangle_b^n$.
23: For $b \in \{0, 1\}$, $P_b$ sets $B_b = idiv(a_b^0 - x_b \cdot n^0, d)$.
24: $P_b$ sets$\langle z \rangle_b^n =_n rdiv(\langle a \rangle_b^n, d) + \langle corr \rangle_b^n \cdot n^1 + b - \langle C \rangle_b^n - B_b$, for $b \in \{0, 1\}$.

Correctness and Security. First, m=$Reconst^B(\langle m \rangle_0^B, \langle m \rangle_1^B)$=$Reconst^B(\langle a \rangle_0^B, \langle a \rangle_1^B)$=$1\{a \geq n'\}$. Next, similar to Algorithm 5, $Reconst^L(\langle corr \rangle_0^L, \langle corr \rangle_1^L)$=corr=$Reconst^\Delta(\langle corr \rangle_0^\Delta, \langle corr \rangle_1^\Delta)$, where corr is as defined in Theorem 4.1. Given the bounds on value of A (as discussed above), we can see that Steps 16 & 17 compute arithmetic shares of A, and $A_0$=(A−d), $A_1$=A, $A_2$=(A+d), respectively. Now, invocation of $\mathcal{F}_{DReLU}^{int,\delta}$ on shares of $A_j$ (Step 19) returns boolean shares of $\gamma$=(1⊕MSB($A_j$)) over $\delta$ bit integers, which is same as 1⊕1$\{A_j<0\}$ over $\mathbb{Z}$. Hence, $C'_j$=$Reconst^B(\langle C'_j \rangle_0^B, \langle C' \rangle_1^B)$=1$\{A_j<0\}$. By correctness of $\mathcal{F}_{B2A}^n$, step 22 computes arithmetic shares of C as defined in Theorem 4.1. In step 23, $B_0+B_1 =_n$ B as defined. Hence, correctness holds and $\langle z \rangle_b^n$ are shares of rdiv(a, d).

Given that $\langle corr \rangle_0^n$ and $\langle corr \rangle_0^\Delta$ are uniformly random, security of the protocol can be seen in $$\left(\binom{4}{1} - OT_{\eta+\delta}, \mathcal{F}_{DReLU}^{int,\delta}, \mathcal{F}_{B2A}^n\right) - \text{hybrid}.$$

Communication complexity. $\Pi_{DIV}^{ring,n,d}$ involves a single call to $\mathcal{F}_{DReLU}^{ring,n}$ and $$\binom{4}{1} - OT_{\eta+\delta},$$

and three calls each to $\mathcal{F}_{DReLU}^{int,\delta}$, and $\mathcal{F}_{B2A}^n$. From Appendix B, we have the cost of $\mathcal{F}_{DReLU}^{ring,n}$ as $(3/2)\lambda\eta + 27\eta - \lambda/2 - 13$ bits.

$$\binom{4}{1} - OT_{\eta+\delta}$$

and $3 \times \mathcal{F}_{B2A}^n$ cost $2\lambda + 4 \cdot (\eta+\delta)$ and $3\lambda+3\eta$ bits respectively. Since the cost of $\mathcal{F}_{DReLU}^{int,\ell}$ is $\lambda\ell + 13\frac{1}{2}\ell - 3\lambda - 35\frac{1}{2}$ bits (see Appendix B), $3 \times \mathcal{F}_{DReLU}^{int,\delta}$, requires $3\lambda\delta + 40\frac{1}{2}\delta - 9\lambda - 106\frac{1}{2}$ bits of communication. Thus, the overall communication of $\Pi_{DIV}^{ring,n,d}$ is $(3/2)\lambda\eta + 34\eta + 3\lambda\delta + 44\frac{1}{2}\delta - 4\frac{1}{2}\lambda - 119\frac{1}{2}$, which can be rewritten as $<(3/2\lambda+34)\cdot(\eta+2\delta)$. Concretely, we get the best communication for $\Pi_{DIV}^{ring,n,49}$ ($\eta$=32) setting m=7 in all our millionaire invocations, which results in a total communication of 7796 bits.

Note that for the case of $\ell$-bit integers, our division protocol would use a call to $\mathcal{F}_{DReLU}^{int,\ell}$ and $$\binom{4}{1} - OT_{\ell+\delta},$$

and three calls each to $\mathcal{F}_{DReLU}^{int,\delta}$, and $\mathcal{F}_{B2A}^L$. The cost of $\mathcal{F}_{DReLU}^{int,\ell}$, and $3 \times \mathcal{F}_{DReLU}^{int,\delta}$ are as mentioned in the previous paragraph, and the cost of $$\binom{4}{1} - OT_{\ell+\delta}$$

and $\mathcal{F}_{B2A}^L$ are $2\lambda + 4 \cdot (\ell+\delta)$ and $3\lambda+3\ell$ bits respectively. Thus, the overall communication is $\lambda\ell + 3\lambda\delta + 20\frac{1}{2}\ell + 44\frac{1}{2}\delta - 7\lambda - 142$ bits, which can be rewritten as $<(\lambda+21) \cdot (\ell+3\delta)$. By setting m=8 in all our millionaire invocations, we get the best communication of 5570 bits for $\Pi_{DIV}^{ring,32,49}$.

E Improvement to Gazelle's Algorithm

Gazelle [42] proposed two methods for computing convolutions, namely, the input rotations and the output rotations method. The only difference between the two methods is the number of (homomorphic) rotations required (the number of homomorphic additions also differ, but they are relatively very cheap). In this section, we describe an optimization to reduce the number of rotations required by the output rotations method.

Let $c_i$ and $c_o$ denote the number of input and output channels respectively, and $c_n$ denote the number of channels that can fit in a single ciphertext. At a high level, the output rotations method works as follows: after performing all the convolutions homomorphically, we have $c_i \cdot c_o/c_n$ intermediate ciphertexts that are to be accumulated to form tightly packed output ciphertexts. Since most of these ciphertexts are misaligned after the convolution, they must be rotated in order to align and pack them. The intermediate ciphertexts can be grouped into $c_o/c_n$ groups of $c_i$ ciphertexts each, such that the ciphertexts within each group are added (after alignment) to form a single ciphertext. In [42], the ciphertexts within each group are rotated (aligned) individually, resulting in $\neq c_i \cdot c_o/c_n$ rotations. We observe that these groups can be further divided into $c_n$ subgroups of $c_i/c_n$ ciphertexts each, such that ciphertexts within a subgroup are misaligned by the same offset. Doing this has the advantage that the $c_i/c_n$ ciphertexts within each subgroup can first be added and then the resulting ciphertext can be aligned using a single rotation. This brings down the number of rotations by a factor of $c_i/c_n$ to $c_n \cdot c_o/c_n$.

With our optimization, the output rotations method is better than the input rotations method when $f^2 \cdot c_i > c_o$, where $f^2$ the filter size, which is usually the case.

F Complexity of Our Benchmarks

The complexity of the benchmarks we use in Section 7 is summarized as follows:

SqueezeNet: There are 26 convolution layers of maximum filter size 3×3 and up to 1000 output channels. The activations after linear layers are ReLUs with size of up to 200,704 elements per layer. All ReLU layers combined have a size of 2,033,480. Additionally, there are 3 Maxpool layers and an Avgpool$_{169}$ layer (Avgpool with pool size 169).

ResNet50: There are 53 convolution layers of maximum filter size 7×7 and a peak output channel count of 2048. Convolution layers are followed by batch normalization and then ReLUs. There are 49 ReLU layers totaling 9,006,592 ReLUs, where the biggest one consists of 802,816 elements. Moreover, ResNet50 also has Maxpool layers and an Avgpool$_{49}$.

DenseNet121: There are 121 convolution layers with maximum filter dimension of 7×7 and up to 1000 output channels. Similar to ResNet50, between 2 convolution layers, there is batch normalization followed by ReLU. The biggest ReLU layer in DenseNet121 has 802,816 elements and the combined size of all ReLU layers is 15,065,344. In addition, DenseNet121 consists of a Maxpool, an Avgpool$_{49}$ and 3 Avgpool$_4$ layers.

G Garbled Circuits vs Our Protocols for Avgpool

In this section, we compare our protocols with garbled circuits for evaluating the Avgpool layers of our benchmarks, and the corresponding performance numbers are given in Table 7.

TABLE 7

Performance comparison of Garbled Circuits with our protocols for computing AVGpool layers. Runtimes are in seconds and communication numbers are in MiB.

|  | Garbled Circuits | | | Our Protocol | | |
|---|---|---|---|---|---|---|
| Benchmark | LAN | WAN | Comm | LAN | WAN | Comm |
| (a) over $\mathbb{Z}_{2^\ell}$ | | | | | | |
| SqueezeNet | 0.2 | 2.0 | 36.02 | 0.1 | 0.8 | 1.84 |
| ResNet50 | 0.4 | 3.9 | 96.97 | 0.1 | 0.8 | 2.35 |
| DenseNet121 | 17.2 | 179.4 | 6017.94 | 0.5 | 3.5 | 158.83 |

TABLE 7-continued

Performance comparison of Garbled Circuits with our protocols for computing AVGpool layers. Runtimes are in seconds and communication numbers are in MiB.

|  | Garbled Circuits | | | Our Protocol | | |
|---|---|---|---|---|---|---|
| Benchmark | LAN | WAN | Comm | LAN | WAN | Comm |
| (b) over $\mathbb{Z}_n$ | | | | | | |
| SqueezeNet | 0.2 | 2.2 | 39.93 | 0.1 | 0.9 | 1.92 |
| ResNet50 | 0.4 | 4.2 | 106.22 | 0.1 | 1.0 | 3.82 |
| DenseNet121 | 19.2 | 198.2 | 6707.94 | 0.6 | 4.4 | 214.94 |

On DenseNet121, where a total of 176, 640 divisions are performed, we have improvements over GC of more than 32× and 45× in the LAN and the WAN setting, respectively, for both our protocols. However, on SqueezeNet and ResNet50, the improvements are smaller (2× to 7×) because these DNNs only require 1000 and 2048 divisions, respectively, which are not enough for the costs in our protocols to amortize well. On the other hand, the communication difference between our protocols and GC is huge for all three DNNs. Specifically, we have an improvement of more than 19×, 27×, and 31× on SqueezeNet, ResNet50, and DenseNet121 respectively, for both our protocols.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

11. BIBLIOGRAPHY

[1] 2020. CrypTFlow: An End-to-end System for Secure TensorFlow Inference. https://github.com/mpc-msri/EzPC. (2020).

[2] 2020. Delphi: A Cryptographic Inference Service for Neural Networks. https://github.com/mc2-project/delphi. (2020).

[3] Martin Abadi, Ashish Agarwal, Paul Barham, Eugene Brevdo, Zhifeng Chen, Craig Citro, Gregory S. Corrado, Andy Davis, Jeffrey Dean, Matthieu Devin, Sanjay Ghemawat, Ian J. Goodfellow, Andrew Harp, Geoffrey Irving, Michael Isard, Yangqing Jia, Rafal Józefowicz, Lukasz Kaiser, Manjunath Kudlur, Josh Levenberg, Dan Mané, Rajat Monga, Sherry Moore, Derek Gordon Murray, Chris Olah, Mike Schuster, Jonathon Shlens, Benoit Steiner, Ilya Sutskever, Kunal Talwar, Paul A. Tucker, Vincent Vanhoucke, Vijay Vasudevan, Fernanda B. Viégas, Oriol Vinyals, Pete Warden, Martin Wattenberg, Martin Wicke, Yuan Yu, and Xiaoqiang Zheng. 2016. TensorFlow: Large-Scale Machine Learning on Heterogeneous Distributed Systems. CoRR abs/1603.04467 (2016). https://arxiv.org/abs/1603.04467

[4] Nitin Agrawal, Ali Shahin Shamsabadi, Matt J. Kusner, and Adrià Gascón. 2019. QUOTIENT: Two-Party Secure Neural Network Training and Prediction. In Proceedings of the 2019 ACMSIGSAC Conference on Computer and Communications Security, CCS 2019, London, UK, Nov. 11-15, 2019. 1231-1247.

[5] Gilad Asharov, Yehuda Lindell, Thomas Schneider, and Michael Zohner. 2013. More efficient oblivious transfer and extensions for faster secure computation. In 2013 ACM SIGSAC Conference on Computer and Communications Security, CCS' 13, Berlin, Germany, Nov. 4-8, 2013, Ahmad-Reza Sadeghi, Virgil D. Gligor, and Moti Yung (Eds.). ACM, 535-548. https://doi.org/10.1145/2508859.2516738

[6] Marshall Ball, Brent Carmer, Tal Malkin, Mike Rosulek, and Nichole Schimanski. 2019. Garbled Neural Networks are Practical. IACR Cryptology ePrint Archive 2019 (2019), 338. https://eprint.iacr.org/2019/338

[7] Assi Barak, Daniel Escudero, Anders Dalskov, and Marcel Keller. 2019. Secure Evaluation of Quantized Neural Networks. Cryptology ePrint Archive, Report 2019/131. (2019). https://eprint.iacr.org/2019/131.

[8] Donald Beaver. 1991. Efficient Multiparty Protocols Using Circuit Randomization. In Advances in Cryptology—CRYPTO '91, 11th Annual International Cryptology Conference, Santa Barbara, California, USA, Aug. 11-15, 1991, Proceedings. 420-432.

[9] Donald Beaver. 1996. Correlated Pseudorandomness and the Complexity of Private Computations. In Proceedings of the Twenty-Eighth Annual ACM Symposium on the Theory of Computing, Philadelphia, Pennsylvania, USA, May 22-24, 1996, Gary L. Miller (Ed.). ACM, 479-488. https://doi.org/10.1145/237814.237996

[10] Mihir Bellare, Viet Tung Hoang, Sriram Keelveedhi, and Phillip Rogaway. 2013. Efficient Garbling from a Fixed-Key Blockcipher. In 2013 IEEE Symposium on Security and Privacy, S P 2013, Berkeley, CA, USA, May 19-22, 2013. IEEE Computer Society, 478-492. https://doi.org/10.1109/SP.2013.39

[11] Mihir Bellare and Phillip Rogaway. 1993. Random Oracles are Practical: A Paradigm for Designing Efficient Protocols. In CCS '93, Proceedings of the 1st ACM Conference on Computer and Communications Security, Fairfax, Virginia, USA, Nov. 3-5, 1993, Dorothy E. Denning, Raymond Pyle, Ravi Ganesan, Ravi S. Sandhu, and Victoria Ashby (Eds.). ACM, 62-73. https://doi.org/10.1145/168588.168596

[12] G. R Blakley. 1979. Safeguarding cryptographic keys. In Managing Requirements Knowledge, International Workshop on. IEEE Computer Society, Los Alamitos, CA, USA, 313. https://doi.org/10.1109/AFIPS.1979.98

[13] Fabian Boemer, Anamaria Costache, Rosario Cammarota, and Casimir Wierzynski. 2019. nGraph-HE2: A High-Throughput Framework for Neural Network Inference on Encrypted Data. In Proceedings of the 7th ACM Workshop on Encrypted Computing & Applied Homomorphic Cryptography, WAHC@CCS 2019, London, UK, Nov. 11-15, 2019, Michael Brenner, Tancrède Lepoint, and Kurt Rohloff (Eds.). ACM, 45-56. https://doi.org/10.1145/3338469.3358944

[14] Fabian Boemer, Yixing Lao, Rosario Cammarota, and Casimir Wierzynski. 2019. nGraph HE: A Graph Compiler for Deep Learning on Homomorphically Encrypted Data. In Proceedings of the 16th ACM International Conference on Computing Frontiers, C F 2019, Alghero, Italy, Apr. 30-May 2, 2019. 3-13.

[15] Raphael Bost, Raluca Ada Popa, Stephen Tu, and Shafi Goldwasser. 2015. Machine Learning Classification over Encrypted Data. In 22nd Annual Network and Distributed System Security Symposium, NDSS 2015, San Diego, California, USA, Feb. 8-11, 2015. The Internet Society. https://www.ndss-symposium.org/ndss2015/machine-learning-classification-over-encrypted-data

[16] Zvika Brakerski. 2012. Fully Homomorphic Encryption without Modulus Switching from Classical GapSVP. In Advances in Cryptology—CRYPTO 2012-32nd Annual Cryptology Conference, Santa Barbara, CA, USA, Aug. 19-23, 2012. Proceedings (Lecture Notes in Computer Science), Reihaneh Safavi-Naini and Ran Canetti (Eds.), Vol. 7417. Springer, 868-886. https://doi.org/10.1007/978-3-642-32009-5_50

[17] Gilles Brassard, Claude Crépeau, and Jean-Marc Robert. 1986. All-or-Nothing Disclosure of Secrets. In Advances in Cryptology—CRYPTO '86, Santa Barbara, California, USA, 1986, Proceedings (Lecture Notes in Computer Science), Andrew M. Odlyzko (Ed.), Vol. 263. Springer, 234-238. https://doi.org/10.1007/3-540-47721-7_17

[18] Niklas Büscher, Daniel Demmler, Stefan Katzenbeisser, David Kretzmer, and Thomas Schneider. 2018. HyCC: Compilation of Hybrid Protocols for Practical Secure Computation. In Proceedings of the 2018 ACM SIGSAC Conference on Computer and Communications Security, CCS 2018, Toronto, ON, Canada, Oct. 15-19, 2018, David Lie, Mohammad Mannan, Michael Backes, and Xiao Feng Wang (Eds.). ACM, 847-861. https://doi.org/10.1145/3243734.3243786

[19] Ran Canetti. 2000. Security and Composition of Multiparty Cryptographic Protocols. J. Cryptology 13, 1 (2000), 143-202.

[20] Nishanth Chandran, Divya Gupta, Aseem Rastogi, Rahul Sharma, and Shardul Tripathi. 2019. EzPC: Programmable and Efficient Secure Two-Party Computation for Machine Learning. In IEEE European Symposium on Security and Privacy, EuroS&P 2019, Stockholm, Sweden, Jun. 17-19, 2019. 496-511.

[21] Valerie Chen, Valerio Pastro, and Mariana Raykova. 2019. Secure Computation for Machine Learning With SPDZ. CoRR abs/1901.00329 (2019). arXiv:1901.00329 http://arxiv.org/abs/1901.00329

[22] Geoffroy Couteau. 2018. New Protocols for Secure Equality Test and Comparison. In Applied Cryptography and Network Security—16th International Conference, ACNS 2018, Leuven, Belgium, Jul. 2-4, 2018, Proceedings (Lecture Notes in Computer Science), Bart Preneel and Frederik Vercauteren (Eds.), Vol. 10892. Springer, 303-320. https://doi.org/10.1007/978-3-319-93387-0_16

[23] Roshan Dathathri, Olli Saarikivi, Hao Chen, Kristin Lauter, Saeed Maleki, Madan Musuvathi, and Todd Mytkowicz. 2019. CHET: An Optimizing Compiler for Fully-Homomorphic Neural-Network Inferencing. In Proceedings of the 40th ACM SIGPLAN Conference on Programming Language Design and Implementation, PLDI 2019, Phoenix, AZ, USA, Jun. 22-26, 2019. 142-156.

[24] Daniel Demmler, Thomas Schneider, and Michael Zohner. 2015. ABY—A Framework for Efficient Mixed-Protocol Secure Two-Party Computation. In 22nd Annual Network and Distributed System Security Symposium, NDSS 2015, San Diego, California, USA, Feb. 8-11, 2015.

[25] Jia Deng, Wei Dong, Richard Socher, Li-Jia Li, Kai Li, and Fei-Fei Li. 2009. ImageNet: A large-scale hierarchical image database. In 2009 IEEE Computer Society Conference on Computer Vision and Pattern Recognition (CVPR 2009), 20-25 Jun. 2009, Miami, Florida, USA. 248-255.

[26] Shimon Even, Oded Goldreich, and Abraham Lempel. 1985. A Randomized Protocol for Signing Contracts. Commun. ACM 28, 6 (1985), 637-647. https://doi.org/10.1145/3812.3818

[27] Junfeng Fan and Frederik Vercauteren. 2012. Somewhat Practical Fully Homomorphic Encryption. Cryptology ePrint Archive, Report 2012/144. (2012). http://eprint.iacr.org/2012/144.

[28] Juan A. Garay, Berry Schoenmakers, and José Villegas. 2007. Practical and Secure Solutions for Integer Comparison. In Public Key Cryptography—PKC 2007, 10th International Conference on Practice and Theory in Public-Key Cryptography, Beijing, China, Apr. 16-20, 2007, Proceedings (Lecture Notes in Computer Science), Tatsuaki Okamoto and Xiaoyun Wang (Eds.), Vol. 4450. Springer, 330-342. https://doi.org/10.1007/978-3-540-71677-8_22

[29] Craig Gentry. 2009. Fully homomorphic encryption using ideal lattices. In Proceedings of the 41st Annual ACM Symposium on Theory of Computing, STOC 2009, Bethesda, MD, USA, May 31-Jun. 2, 2009, Michael Mitzenmacher (Ed.). ACM, 169 178. https://doi.org/10.1145/1536414.1536440

[30] Ran Gilad-Bachrach, Nathan Dowlin, Kim Lathe, Kristin E. Lauter, Michael Naehrig, and John Wernsing. 2016. CryptoNets: Applying Neural Networks to Encrypted Data with High Throughput and Accuracy. In Proceedings of the 33nd International Conference on Machine Learning, ICML 2016, New York City, NY, USA, Jun. 19-24, 2016. 201-210.

[31] Oded Goldreich, Silvio Micali, and Avi Wigderson. 1987. How to Play any Mental Game or A Completeness Theorem for Protocols with Honest Majority. In Proceedings of the 19th Annual ACM Symposium on Theory of Computing, 1987, New York, New York, USA. 218-229.

[32] Shay Gueron. 2016. AES-GCM-SIV implementations (128 and 256 bit). https://github.com/Shay-Gueron/AES-GCM-SIV. (2016).

[33] Shay Gueron, Yehuda Lindell, Ariel Nof, and Benny Pinkas. 2018. Fast Garbling of Circuits Under Standard Assumptions. J. Cryptol. 31, 3 (2018). https://doi.org/10.1007/s00145-017-9271-y

[34] C. Guo, J. Katz, X. Wang, and Y. Yu. 2020. Efficient and Secure Multiparty Computation from Fixed-Key Block Ciphers. In 2020 IEEE Symposium on Security and Privacy (SP). IEEE Computer Society, Los Alamitos, CA, USA, 247-263. https://doi.org/10.1109/SP.2020.00016

[35] Carmit Hazay, Yuval Ishai, Antonio Marcedone, and Muthuramakrishnan Venkitasubramaniam. 2019. LevioSA: Lightweight Secure Arithmetic Computation. In Proceedings of the 2019 ACM Conference on Computer and Communications Security, CCS 2019, London, UK, Nov. 11-15, 2019. 327-344.

[36] Kaiming He, Xiangyu Zhang, Shaoqing Ren, and Jian Sun. 2016. Deep Residual Learning for Image Recognition. In 2016 IEEE Conference on Computer Vision and Pattern Recognition, CVPR 2016, Las Vegas, NV, USA, Jun. 27-30, 2016. 770-778.

[37] Gao Huang, Zhuang Liu, Laurens van der Maaten, and Kilian Q. Weinberger. 2017. Densely Connected Convolutional Networks. In 2017 IEEE Conference on Computer Vision and Pattern Recognition, CVPR 2017, Honolulu, HI, USA, Jul. 21-26, 2017. 2261-2269.

[38] Itay Hubara, Matthieu Courbariaux, Daniel Soudry, Ran El-Yaniv, and Yoshua Bengio. 2016. Binarized Neural Networks. In Advances in Neural Information Processing Systems 29: Annual Conference on Neural Information Processing Systems 2016, Dec. 5-10, 2016, Barcelona, Spain, Daniel D. Lee, Masashi Sugiyama, Ulrike von Luxburg, Isabelle Guyon, and Roman Garnett (Eds.). 4107-4115.

[39] Forrest N. Iandola, Matthew W. Moskewicz, Khalid Ashraf, Song Han, William J. Dally, and Kurt Keutzer. 2016. SqueezeNet: AlexNet-level accuracy with 50× fewer parameters and <1 MB model size. CoRR abs/1602.07360 (2016).arXiv:1602.07360 http://arxiv.org/abs/1602.07360

[40] Yuval Ishai, Joe Kilian, Kobbi Nissim, and Erez Petrank. 2003. Extending Oblivious Transfers Efficiently. In Advances in Cryptology—CRYPTO 2003, 23rd Annual International Cryptology Conference, Santa Barbara, California, USA, Aug. 17-21, 2003, Proceedings (Lecture Notes in Computer Science), Dan Boneh (Ed.), Vol. 2729. Springer, 145-161. https://doi.org/10.1007/978-3-540-45146-4_9

[41] Benoit Jacob, Skirmantas Kligys, Bo Chen, Menglong Zhu, Matthew Tang, Andrew G. Howard, Hartwig Adam, and Dmitry Kalenichenko. 2018. Quantization and Training of Neural Networks for Efficient Integer-Arithmetic-Only Inference. In 2018 IEEE Conference on Computer Vision and Pattern Recognition, CVPR 2018, Salt Lake City, UT, USA, Jun. 18-22, 2018. 2704-2713.

[42] Chiraag Juvekar, Vinod Vaikuntanathan, and Anantha Chandrakasan. 2018. GAZELLE: A Low Latency Framework for Secure Neural Network Inference. In 27th USENIX Security Symposium, USENIX Security 2018, Baltimore, MD, USA, Aug. 15-17, 2018. 1651-1669.

[43] Vladimir Kolesnikov and Ranjit Kumaresan. 2013. Improved OT Extension for Transferring Short Secrets. In Advances in Cryptology—CRYPTO 2013-33rd Annual Cryptology Conference, Santa Barbara, CA, USA, Aug. 18-22, 2013. Proceedings, Part II (Lecture Notes in Computer Science), Ran Canetti and Juan A. Garay (Eds.), Vol. 8043. Springer, 54-70. https://doi.org/10.1007/978-3-642-40084-1_4

[44] Nishant Kumar, Mayank Rathee, Nishanth Chandran, Divya Gupta, Aseem Rastogi, and Rahul Sharma. 2020. CrypTFlow: Secure TensorFlow Inference. In 2020 IEEE Symposium on Security and Privacy, S&P 2020, San Francisco, CA, USA, May 18-20, 2020. 1521-1538.

[45] Kim Lathe. 2017. Simple Encrypted Arithmetic Library 2.3.1. https://www.microsoft.com/en-us/research/uploads/prod/2017/11/sealmanual-2-3-1.pdf.

[46] Yehuda Lindell. 2016. How To Simulate It—A Tutorial on the Simulation Proof Technique. Cryptology ePrint Archive, Report 2016/046. (2016). https://eprint.iacr.org/2016/046.

[47] Jian Liu, Mika Juuti, Yao Lu, and N. Asokan. 2017. Oblivious Neural Network Predictions via MiniONN Transformations. In Proceedings of the 2017 ACM SIGSAC Conference on Computer and Communications Security, CCS 2017, Dallas, TX, USA, Oct. 30-Nov. 3, 2017. 619-631.

[48] Pratyush Mishra, Ryan Lehmkuhl, Akshayaram Srinivasan, Wenting Zheng, and Raluca Ada Popa. 2020. Delphi: A Cryptographic Inference Service for Neural Networks. In 29th USENIX Security Symposium, USENIX Security 20. Boston, MA.

[49] Payman Mohassel and Peter Rindal. 2018. ABY3: A Mixed Protocol Framework for Machine Learning. In Proceedings of the 2018 ACM SIGSAC Conference on Computer and Communications Security, CCS 2018, Toronto, ON, Canada, Oct. 15-19, 2018. 35-52.

[50] Payman Mohassel and Yupeng Zhang. 2017. SecureML: A System for Scalable Privacy-Preserving Machine Learning. In 2017 IEEE Symposium on Security and Privacy, S&P 2017, San Jose, CA, USA, May 22-26, 2017. 19-38.

[51] Markus Nagel, Mart van Baalen, Tijmen Blankevoort, and Max Welling. 2019. Data-Free Quantization Through Weight Equalization and Bias Correction. In 2019 IEEE/CVF International Conference on Computer Vision, ICCV 2019, Seoul, Korea (South), Oct. 27-Nov. 2, 2019. IEEE, 1325-1334.

[52] Erman Pattuk, Murat Kantarcioglu, Huseyin Ulusoy, and Bradley A. Malin. 2016. CheapSMC: A Framework to Minimize Secure Multiparty Computation Cost in the Cloud. In Data and Applications Security and Privacy XXX—30th Annual IFIP WG 11.3 Conference, DBSec 2016, Trento, Italy, Jul. 18-20, 2016. Proceedings (Lecture Notes in Computer Science), Silvio Ranise and Vipin Swarup (Eds.), Vol. 9766. Springer, 285 294.

[53] Michael O. Rabin. 1981. How to exchange secrets with oblivious transfer. Technical Report TR-81, Aiken Computation Lab, Harvard University. (1981). https://eprint.iacr.org/2005/187.pdf.

[54] M. Sadegh Riazi, Mohammad Samragh, Hao Chen, Kim Laine, Kristin E. Lauter, and Farinaz Koushanfar. 2019. XONN: XNOR-based Oblivious Deep Neural Network Inference. In 28th USENIX Security Symposium, USENIX Security 2019, Santa Clara, CA, USA, Aug. 14-16, 2019. 1501-1518.

[55] M. Sadegh Riazi, Christian Weinert, Oleksandr Tkachenko, Ebrahim M. Songhori, Thomas Schneider, and Farinaz Koushanfar. 2018. Chameleon: A Hybrid Secure Computation Framework for Machine Learning Applications. In Proceedings of the 2018 on Asia Conference on Computer and Communications Security, AsiaCCS 2018, Incheon, Republic of Korea, Jun. 4-8, 2018. 707-721. https://doi.org/10.1145/3196494.3196522

[56] Bita Darvish Rouhani, M. Sadegh Riazi, and Farinaz Koushanfar. 2018. Deepsecure: scalable provably-secure deep learning. In Proceedings of the 55th Annual Design Automation Conference, D A C 2018, San Francisco, CA, USA, Jun. 24-29, 2018. ACM, 2:1-2:6.

[57] SEAL 2019. Microsoft SEAL (release 3.3). https://github.com/Microsoft/SEAL. (2019). Microsoft Research, Redmond, WA.

[58] Adi Shamir. 1979. How to Share a Secret. Commun. ACM 22, 11 (1979), 612-613. https://doi.org/10.1145/359168.359176

[59] N. P. Smart and F. Vercauteren. 2011. Fully Homomorphic SIMD Operations. Cryptology ePrint Archive, Report 2011/133. (2011). http://eprint.iacr.org/2011/133.

[60] Sameer Wagh, Divya Gupta, and Nishanth Chandran. 2019. SecureNN: 3-Party Secure Computation for Neural Network Training. PoPETs 2019, 3 (2019), 26-49.

[61] Xiao Wang, Alex J. Malozemoff, and Jonathan Katz. 2016. EMP-toolkit: Efficient MultiParty computation toolkit. https://github.com/emp-toolkit. (2016).

[62] Andrew Chi-Chih Yao. 1986. How to Generate and Exchange Secrets (Extended Abstract). In 27th Annual Symposium on Foundations of Computer Science, Toronto, Canada, 27-29 Oct. 1986. IEEE Computer Society, 162-167. https://doi.org/10.1109/SFCS.1986.25

[63] Wenting Zheng, Raluca Ada Popa, Joseph E. Gonzalez, and Ion Stoica. 2019. Helen: Maliciously Secure Coopetitive Learning for Linear Models. In 2019 IEEE Symposium on Security and Privacy, S&P 2019, San Francisco, CA, USA, May 19-23, 2019. 724-738.

[64] Xiaoyong Zhu, George Iordanescu, Ilia Karmanov, and Mazen Zawaideh. 2018. (March 2018). https://blogs.technet.microsoft.com/machinelearning/2018/03/07/using-microsoft-ai-to-build-a-lung-disease-prediction-model-using-chest-xray-images/

What is claimed is:

1. A method for performing secure inference over a Deep Neural Network (DNN) using secure two-party computation, which involves a first party and a second party, to perform privacy-preserving machine learning such that a provider of the DNN does not learn anything about inputs to the DNN or about weights of the DNN beyond that which can be inferred from an output of the DNN and the inputs to the DNN, wherein said method is further performed in a manner to reduce communications between the first party and the second party via use of an oblivious transfer technique, the method comprising:
  performing a comparison that securely computes a Boolean share of a bit representing whether input value x is less than input value y, where x is held by a user of the DNN, and where y is held by the provider of the DNN, the comparison performed by:
    parsing x into q leaf strings $x_{q-1} \ldots x_0$, where each of the q leaf strings is more than one bit, and where x is equal to the concatenation $x_{q-1}\| \ldots \|x_0$;
    compute shares of inequality $1\{x_n < y_n\}$ for each of at least some n from q−1 down to 1, where y is equal to the concatenation $y_{q-1}\| \ldots \| y_0$, by in each case using oblivious transfer;
    compute shares of equality $1\{x_n = y_n\}$ for each of at least some n from q−1 down to 1 also in each case by using oblivious transfer; and
    recursively calculating shares of inequality of internal nodes according to the following equation: $1\{x_C < y_C\} = 1\{x_B < y_B\} \oplus 1\{x_B = y_B\} \wedge \{x_A < y_A\}$ (where $x_C = x_B \| x_A$, and $y_C = y_B \| y_A$), and shares of equality of internal nodes until the Boolean share of $1\{x < y\}$ is determined; and
  repeatedly performing the comparison for different inputs to traverse a garbled binary circuit that represents the DNN to thereby obtain a result of the garbled binary circuit.

2. The method in accordance with claim 1, wherein inputs x and y are each of size $\ell$ bits, and each leaf string is of size m bits, where m divides $\ell$.

3. The method in accordance with claim 1, wherein inputs x and y are each of size $\ell$ bits, and each leaf string has a maximum size of m bits, where m does not divide $\ell$.

4. The method in accordance with claim 1, the parsing comprising parsing so that at least one of the leaf strings of each of the inputs has less than m bits.

5. The method in accordance with claim 2, wherein $\ell/m$ is not a power of 2.

6. The method in accordance with claim 5, the recursively calculating shares comprising first constructing a binary tree with a power of two leaves.

7. The method in accordance with claim 1, the computing shares of inequality $1\{x_n < y_n\}$ occurring for each of all n from q−1 down to 1, and the computing shares of equality $1\{x_n = y_n\}$ occurring for each of all n from q−1 down to 1.

8. The method in accordance with claim 1, wherein for at least one of the comparisons, the comparison is performed as part of a ReLU activation on a value $a \in \mathbb{Z}_L$ using arithmetic shares of a.

9. The method in accordance with claim 8, where shares of the ReLU activation are obtained by:
  performing the comparison on the input shares by performing the comparison on all but the most significant bit of a.

10. The method in accordance with claim 1, wherein for at least one of the comparisons, the comparison is performed as part of a division operation.

11. A method for performing secure inference over a Deep Neural Network (DNN) using secure two-party computation, which involves a first party and a second party, to perform privacy-preserving machine learning such that a provider of the DNN does not learn anything about inputs to the DNN or about weights of the DNN beyond that which can be inferred from an output of the DNN and the inputs to the DNN, wherein said method is further performed in a manner to reduce communications between the first party and the second party via use of an oblivious transfer technique, the method comprising:
  performing a comparison that securely computes a Boolean share of a bit representing whether input value x is less than input value y, where x is held by a user of the DNN, and where y is held by the provider of the DNN, the comparison performed by:
    parsing y into q leaf strings $y_{q-1} \ldots y_0$, where each of the q leaf strings is more than one bit, and where y is equal to the concatenation $y_{q-1}\| \ldots \|y_0$;
    compute shares of inequality $1\{x_n < y_n\}$ for each of at least some n from q−1 down to 1, where x is equal to the concatenation $x_{q-1}\| \ldots \|x_0$, by in each case using oblivious transfer;
    compute shares of equality $1\{x_n = y_n\}$ for each of at least some n from q−1 down to 1 also in each case by using oblivious transfer; and
    recursively calculating shares of inequality of internal nodes according to the following equation:

$1\{x_C<y_C\}=1\{x_B<y_B\}\oplus 1\{x_B=y_B\}\wedge 1\{x_A<y_A\}$
(where $x_C=x_B\|x_A$, and $y_C=y_B\|y_A$), and shares of equality of internal nodes until the Boolean share of $1\{x<y\}$ is determined; and repeatedly performing the comparison for different inputs to traverse a garbled binary circuit that represents the DNN to thereby obtain a result of the garbled binary circuit.

12. The method in accordance with claim 11, wherein inputs x and y are each of size ℓ bits, and each of multiple leaf string is of size m bits, the computation of shares of inequality $1\{x_n<y_n\}$ for each of at least one of the multiple leaf strings of size m bits is performed using $$\binom{M}{1}-OT_1$$

oblivious transfer.

13. The method in accordance with claim 12, wherein multiple performances of the $$\binom{M}{1}-OT_1$$

oblivious transfer are performed using a single call.

14. The method in accordance with claim 11, wherein inputs x and y are each of size ℓ bits, and each of multiple leaf string is of size m bits, the computation of shares of equality $1\{x_n=y_n\}$ for each of at least one of the multiple leaf strings of size m bits is performed using $$\binom{M}{1}-OT_1$$

oblivious transfer.

15. The method in accordance with claim 14, wherein multiple performances of the $$\binom{M}{1}-OT_1$$

oblivious transfer are performed using a single call.

16. A computing system for performing secure inference over a Deep Neural Network (DNN) using secure two-party computation, which involves a first party and a second party, to perform privacy-preserving machine learning such that a provider of the DNN does not learn anything about inputs to the DNN or about weights of the DNN beyond that which can be inferred from an output of the DNN and the inputs to the DNN, wherein said method is further performed in a manner to reduce communications between the first party and the second party via use of an oblivious transfer technique, the computing system comprising:

one or more processing units; and
computer-readable storage media having thereon instructions that are executable by the one or more processing units to cause the computing system to perform a comparison that securely computes a Boolean share of a bit representing whether input value x is less than input value y, where x is held by a user of the DNN, and where y is held by the provider of the DNN, the comparison performed by:

parsing y into q leaf strings $y_{q-1} \ldots y_0$, where each of the q leaf strings is more than one bit, and where y is equal to the concatenation $y_{q-1}\| \ldots \|y_0$;

compute shares of inequality $1\{x_n<y_n\}$ for each of at least some n from q−1 down to 1, where x is equal to the concatenation $x_{q-1}\| \ldots \|x_0$, by in each case using oblivious transfer;

compute shares of equality $1\{x_n=y_n\}$ for each of at least some n from q−1 down to 1 also in each case by using oblivious transfer; and recursively calculating shares of inequality of internal nodes according to the following equation:
$1\{x_C<y_C\}=1\{x_B<y_B\}\oplus 1\{x_B=y_B\}\wedge 1\{x_A<y_A\}$
(where $x_C=x_B\|x_A$, and $y_C=y_B\|y_A$), and shares of equality of internal nodes until the Boolean share of $1\{x<y\}$ is determined; and repeatedly performing the comparison for different inputs to traverse a garbled binary circuit that represents the DNN to thereby obtain a result of the garbled binary circuit.

17. The computing system in accordance with claim 16, wherein inputs x and y are each of size ℓ bits, and each of multiple leaf string is of size m bits, the computation of shares of inequality $1\{x_n<y_n\}$ for each of at least one of the multiple leaf strings of size m bits is performed using $$\binom{M}{1}-OT_1$$

oblivious transfer.

18. The computing system in accordance with claim 17, wherein multiple performances of the $$\binom{M}{1}-OT_1$$

oblivious transfer are performed using a single call.

19. The computing system in accordance with claim 16, wherein inputs x and y are each of size ℓ bits, and each of multiple leaf string is of size m bits, the computation of shares of equality $1\{x_n=y_n\}$ for each of at least one of the multiple leaf strings of size m bits is performed using $$\binom{M}{1}-OT_1$$

oblivious transfer.

20. The computing system in accordance with claim 19, wherein multiple performances of the $$\binom{M}{1}-OT_1$$

oblivious transfer are performed using a single call.

* * * * *